United States Patent [19]
Rolchigo et al.

[11] Patent Number: 5,944,998
[45] Date of Patent: Aug. 31, 1999

[54] ROTARY FILTRATION DEVICE WITH FLOW-THROUGH INNER MEMBER

[75] Inventors: Philip M. Rolchigo, Warren; Leonard T. Hodgins, Closter, both of N.J.

[73] Assignee: Membrex, Inc., Fairfield, N.J.

[21] Appl. No.: 09/063,931

[22] Filed: Apr. 21, 1998

[51] Int. Cl.⁶ ..................................................... B01D 65/08
[52] U.S. Cl. .......................... 210/645; 210/650; 210/787; 210/799; 210/800; 210/804; 210/256; 210/257.1; 210/258; 210/319; 210/321.63; 210/321.64; 210/391; 210/415; 210/416.1; 210/512.3; 210/513; 422/101; 436/178; 366/282; 366/305; 366/306
[58] Field of Search ..................................... 210/645, 650, 210/787, 799, 800, 804, 256, 257.1, 258, 319, 321.63, 321.64, 295, 407, 413, 415, 391, 416.1, 512.1, 512.3, 513; 422/101; 436/178; 366/282, 305, 306

[56] References Cited

U.S. PATENT DOCUMENTS

| | | |
|---|---|---|
| 4,025,425 | 5/1977 | Croopnick et al. . |
| 4,776,964 | 10/1988 | Schoendorfer et al. . |
| 4,790,942 | 12/1988 | Shmidt et al. . |
| 4,867,878 | 9/1989 | Rashev . |
| 4,876,013 | 10/1989 | Shmidt et al. . |
| 4,906,379 | 3/1990 | Hodgins et al. . |
| 4,911,847 | 3/1990 | Shmidt et al. . |
| 5,000,848 | 3/1991 | Hodgins et al. . |
| 5,143,630 | 9/1992 | Rolchigo . |
| 5,254,250 | 10/1993 | Rolchigo et al. . |
| 5,679,249 | 10/1997 | Fendya et al. ..................... 210/321.63 |
| 5,707,517 | 1/1998 | Rolchigo et al. . |

FOREIGN PATENT DOCUMENTS

WO 93/12859   7/1993   WIPO .

OTHER PUBLICATIONS

Hildebrandt, "Downstream Processing With Hydrophilic Membranes In Rotary Filtration Systems," Massachusetts Institute of Technology Biotechnology Process Engineering Center Workshop on Advances in Membrane Technology for Bioprocesses (Jun. 24, 1988).

Hildebrandt et al., "The Use Of Taylor Vortices In Protein Processing To Enhance Membrane filtration Performance," Bioprocessing Engineering Colloquium (American Society of Mechanical Engineers, Nov. 1987).

Membrex, Inc., "BENCHMARK Rotary Biopurification System," 6–page brochure (Apr. 1988).

Hildebrandt, "Integrated Systems Approaches To Membrane Operations In Bioprocessing," Biotech USA '88, San Francisco (Nov. 14, 1988).

Rolchigo et al., "The Improved Control Of Ultrafiltration With The Use Of Vorticular Hydrodynamics And Ultra–Hydrophilic Membranes," AIChE 1988 Annual Meeting, Washington, D.C. (Membrex, Inc., Dec. 1, 1988).

*Primary Examiner*—Robert J. Popovics
*Attorney, Agent, or Firm*—Bryan Cave LLP

[57] ABSTRACT

Rotary filtration devices and processes are disclosed. The devices have at least one inner member and at least one outer member, one or both of which rotate so that they rotate with respect to one another and which define a fluid filtration gap therebetween. There are one or more filters facing the fluid filtration gap and which are located either on the inner member or on the outer member or on both. During the filtration process, permeate passes from the feed fluid in the fluid filtration gap through the one or more filters. The inner member has an internal pathway for the flow of feed fluid. Fluid from the body of fluid to be filtered flows from the body of feed fluid to be filtered through the internal pathway, reverses direction, and then flows through the fluid filtration gap back to the body of feed fluid. Alternatively, fluid from the body of fluid to be filtered passes from the body of feed fluid to be filtered through the fluid filtration gap, reverses direction, and then flows through the internal pathway back to the body of feed fluid. The outer member may be closed so that feed fluid keeps circulating in the fluid filtration gap until it leaves through the filter as permeate or reenters the surrounding reservoir of feed fluid via, for example, a pressure control valve that relieves any overpressure condition in the fluid filtration gap.

80 Claims, 5 Drawing Sheets

ROTARY FILTRATION DEVICE WITH FLOW-THROUGH INNER MEMBER

BACKGROUND OF THE INVENTION

1. Technical Field

This invention concerns the field of filtration and more specifically, rotary filtration devices.

2. Background Art

Filtration devices are used to separate one or more components of a fluid from other components. Common processes carried out in such devices include classic filtration, microfiltration, ultrafiltration, reverse osmosis, dialysis, electrodialysis, pervaporation, water splitting, sieving, affinity separation, affinity purification, affinity sorption, chromatography, gel filtration, and bacteriological filtration. As used herein, the term "filtration" includes all of those separation processes as well as any other processes using a filter that separate one or more components of a fluid from the other components of the fluid.

Filtration processes make use of the greater filter permeability of some fluid components than others. As used herein, the term "filter" includes any article made of any material that allows one or more components of a fluid to pass through it to separate those components from other components of the fluid. Thus, the term "filter" includes metallic and polymeric cloth filters, semipermeable membranes and inorganic sieve materials (e.g., zeolites, ceramics). A filter may have any shape or form, for example, woven or non-woven fabrics, fibers, membranes, sieves, sheets, films, and combinations thereof.

The components of the feed fluid that pass through the filter comprise the "permeate" and those that do not pass (i.e., are rejected by the filter or are held by the filter) comprise the "retentate." The valuable fraction from the filtration process may be the retentate or the permeate or in some cases both may be valuable.

A common technical problem in all filtration devices is blinding or clogging of the filter. Permeate passing through the filter from the feed fluid layer adjacent to the feed side of the filter leaves a layer adjacent to or on that side of the filter having a different composition than that of the bulk feed fluid. This material may bind to the filter and clog its pores (that is, foul the filter) or remain as a stagnant boundary layer, either of which hinders transport of the feed fluid components trying to pass through the filter to the permeate product side of the filter. In other words, mass transport per unit area through the filter per unit time (i.e., flux) is reduced and the inherent sieving capability of the filter is adversely affected.

Generally, fouling of the filter is chemical in nature, involving chemisorption of substances in the feed fluid onto the filter's internal (pore) and external surface area. Unless the chemical properties of the filter surface are altered to prevent or reduce adsorption, frequent and costly filter replacement or cleaning operations are necessary.

One of the most common causes of fouling arises from the low surface energy (e.g., hydrophobic nature) of many filters. U.S. Pat. Nos. 4,906,379 and 5,000,848, which are assigned to Membrex, Inc., assignee of the present application, disclose chemical modification to increase the surface free energy (e.g., hydrophilicity) of filter surfaces. (All of the documents identified, discussed, or otherwise referenced in this application are incorporated herein in their entirety for all purposes.) In general, however, relatively little attention has been given to modifying surface chemistry to reduce filter fouling.

In contrast to the chemical nature of most fouling problems, the formation of a boundary layer near the surface of the filter is physical in nature, arising from an imbalance in the mass transfer of feed fluid components towards the filter surface as compared to the back-transfer from the boundary layer to the bulk feed fluid. Some form of force (for example, mechanical, electro-kinetic) must be used to promote the desired mass transfer away from the filter surface. Unfortunately, few strategies have been developed that promote adequate back-mixing to reduce the boundary layer or prevent its formation.

The most common strategy is called "cross-flow" filtration ("CFF") or "tangential flow" filtration ("TFF"). In principle, the feed fluid is pumped across (i.e., parallel to) the outer surface of the filter at a velocity high enough to disrupt and back-mix the boundary layer. In practice, however, cross-flow has several disadvantages. For example, equipment must be designed to handle the higher flow rates that are required, and such higher flow rates generally require recirculating retentate. However, recirculation can injure certain materials that may be present in the fluid (e.g., cells, proteins) and make them unsuitable for further use (e.g., testing).

A different approach to eliminating the stagnant boundary layer involves decoupling the feed flow rate from the applied pressure. With this approach, a structural element of the filtration device, rather than the feed fluid, is moved to effect back-mixing and reduction of the boundary layer. The moving body may be the filter itself or a body located near the filter element.

Some of the rare moving-body devices that have enhanced filtration without energy inefficient turbulence are exemplified in U.S. Pat. No. 4,790,942, U.S. Pat. No. 4,867,878, U.S. Pat. No. 4,876,013, U.S. Pat. No. 4,911,847, and U.S. Pat. No. 5,000,848 (assigned to Membrex, Inc.). These patents each disclose the use of filtration apparatus comprising outer and inner cylindrical bodies defining an annular gap for receiving a feed fluid. The surface of at least one of the bodies defining the gap is the surface of a filter, and one or both of the bodies may be rotated. Induced rotational flow between these cylinders is an example of unstable fluid stratification caused by centrifugal forces. The onset of this instability can be expressed with the aid of a characteristic number known as the Taylor number. Above a certain value of the Taylor number, a vortical flow profile comprising so-called Taylor vortices appears. This type of secondary flow causes highly efficient non-turbulent shear at the filter surface(s) that reduces the stagnant boundary layer thickness and, thus, increases the permeate flux.

In contrast to classic cross-flow filtration, the devices of those patents allow the shear rate near the filtration surface and the transmembrane pressure to be independently controlled. Furthermore, because those two operating parameters are independent and high feed rates are not required to improve the permeate flux, the feed rate can be adjusted to avoid non-uniform transmembrane pressure distributions. Accordingly, mechanically agitated systems of this type enable precise control over the separation.

Rotary disc filtration devices also allow shear rate near the filtration surface and transmembrane pressure to be independently controlled. In such devices feed fluid is placed between the disc and oppositely disposed filtration surface that define the fluid filtration gap and one or both of the disc and filtration surface are rotated. See, e.g., U.S. Pat. Nos. 5,143,630, 5,254,250, and 5,707,517 (all assigned to Membrex, Inc.).

Despite the substantial work that has been done, the need remains for rotary separation devices (and processes using them) that have one or more of the following features and advantages: a relatively simple design; means for creating sufficient shear at the filter surface to prevent or reduce blinding or fouling of the filter; the decoupling of the fluid movement in the fluid filtration gap that creates the desired shear from the fluid movement in the main body (or reservoir) of feed fluid thereby, among other things, to allow flotation of less dense material in the feed fluid and settling of more dense material in the feed fluid; the ability to efficaciously process the feed fluid until only a small volume of feed fluid remains and to keep the filter wet even as the amount of fluid decreases to only a very small volume; the ability to pressurize the fluid in the fluid filtration gap, which may aid the filtration process, without the need for high pressure vessels for holding the main body (reservoir) of feed fluid; the ability to control the amount of feed fluid entering the fluid filtration gap per unit time independent of the shear caused, e.g., by Taylor vortices and independent of the permeate flow; the possibility of eliminating the use a feed pump, the elimination of which can be most advantageous if the feed fluid contains solids or other materials that would making pumping such fluid less desirable and/or difficult; and the ability to process a reservoir of feed fluid that may not be in a conventional vessel (such as fluid in a lake or fermentation vessel). Other technical problems that may be solved by the present invention will be apparent to one skilled in the art from this disclosure.

SUMMARY OF THE INVENTION

Such devices and processes having those features and advantages, as well as other features and advantages that will be apparent to those skilled in the art, have now been developed. Broadly, in one aspect this invention concerns a rotary filtration device for filtering feed fluid to remove permeate from the feed fluid, the device comprising:

a) an elongate outer member;

b) an elongate inner member, which inner member is at least partially disposed within the outer member such that the outer member and the inner member form an elongate fluid filtration gap therebetween into which the feed fluid to be filtered is placed, the inner member having an internal pathway for the flow of feed fluid, the overall direction of which pathway is substantially parallel to the overall direction of the fluid filtration gap;

c) rotation means for rotating the inner member and outer member with respect to each other;

d) one or more filters facing the fluid filtration gap through which permeate passes from the feed fluid in the fluid filtration gap during filtration;

e) fluid connection means for fluidly connecting the fluid filtration gap to the internal pathway of the inner member; and f) fluid motive means for moving feed fluid through the fluid connection means during filtration from the fluid filtration gap into the internal pathway or from the internal pathway into the fluid filtration gap.

In another aspect this invention concerns a rotary filtration device for filtering feed fluid to remove permeate from the feed fluid, there being a reservoir of feed fluid having a fluid level, the device comprising:

a) an outer member;

b) an inner member, which inner member is at least partially disposed within the outer member such that the outer member and the inner member form a fluid filtration gap therebetween into which the feed fluid to be filtered is placed, the inner member having an internal pathway for the flow of feed fluid;

c) rotation means for rotating the inner member and outer member with respect to each other;

d) one or more filters facing the fluid filtration gap through which permeate passes from the feed fluid in the fluid filtration gap during filtration;

e) fluid connection means for fluidly connecting the fluid filtration gap to the internal pathway of the inner member;

f) fluid motive means for moving feed fluid through the fluid connection means during filtration from the fluid filtration gap into the internal pathway or from the internal pathway into the fluid filtration gap; and g) flow direction reversal means to reverse the direction of flow of feed fluid flowing during filtration from the fluid filtration gap into the internal pathway or from the internal pathway into the fluid filtration gap, so that the overall principal direction of flow of feed fluid in the fluid filtration gap is substantially the opposite of the overall principal direction of flow of feed fluid in the internal pathway.

In another aspect this invention concerns a rotary filtration device for filtering feed fluid to remove permeate from the feed fluid, there being a reservoir of feed fluid having a fluid level, the device comprising:

a) an outer member having a lower end with an opening;

b) a rotatable inner member (i) having a longitudinal axis of rotation, (ii) having an internal pathway for the flow of feed fluid, which pathway has a lower end, and (iii) located at least partially within the outer member such that the outer member and the inner member form a fluid filtration gap therebetween into which the feed fluid to be filtered is placed;

c) rotation means for rotating the inner member about its longitudinal axis of rotation;

d) one or more filters facing the fluid filtration gap through which permeate passes from the feed fluid in the fluid filtration gap during filtration;

e) fluid connection means for fluidly connecting the fluid filtration gap to the internal pathway of the inner member;

f) fluid motive means for moving feed fluid through the fluid connection means during filtration from the fluid filtration gap into the internal pathway or from the internal pathway into the fluid filtration gap;

g) flow direction reversal means to reverse the direction of flow of feed fluid flowing during filtration from the fluid filtration gap into the internal pathway of the inner member or from the internal pathway of the inner member into the fluid filtration gap, so that the overall principal direction of flow of feed fluid in the fluid filtration gap is substantially the opposite of the overall principal direction of flow of feed fluid in the internal pathway of the inner member, both overall principal directions of flow being substantially parallel to the longitudinal axis of rotation; and h) means to at least temporarily maintain the outer member or inner member or both at least partially in the reservoir of feed fluid so that the lower end of the outer member or the lower end of the internal pathway of the inner member or both lower ends are below the fluid level of the feed fluid in the reservoir at least some of the time during filtration so that feed fluid can flow from the reservoir into the fluid filtration gap or into the internal pathway of the inner member during filtration.

In another aspect, the invention concerns a rotary filtration device for filtering feed fluid to remove permeate from the feed fluid, the device comprising:

a) a vessel having an upper region and into which feed fluid is placed, the feed fluid having a fluid level when it is in the vessel;

b) a stationary cylindrical outer member (i) located within the vessel and suspended from the upper region of the vessel, (ii) having a lower end with an opening, and (iii) having an inner surface with a filter mounted thereon through which permeate passes during filtration;

c) a rotatable cylindrical inner member (i) rotatably suspended from the upper region of the vessel, (ii) having a longitudinal axis of rotation, (iii) having an internal pathway for the flow of feed fluid, which pathway is substantially cylindrical in shape and has a lower end, and (iv) located within the outer member such that the outer member and the filter on the inner member form an annular fluid filtration gap therebetween into which the feed fluid to be filtered is placed; the lower end of the outer member or the lower end of the internal pathway of the inner member or both being below the fluid level in the vessel at least some of the time so that feed fluid can flow from the vessel into the fluid filtration gap or into the internal pathway of the inner member during filtration;

d) rotation means for rotating the inner member about its longitudinal axis of rotation;

e) fluid connection means for fluidly connecting the fluid filtration gap to the internal pathway of the inner member proximate the upper region of the vessel;

f) fluid motive means for moving feed fluid through the fluid connection means during filtration from the fluid filtration gap into the internal pathway or from the internal pathway into the fluid filtration gap; and g) flow direction reversal means to reverse the direction of flow of feed fluid flowing during filtration from the fluid filtration gap into the internal pathway of the inner member or from the internal pathway of the inner member into the fluid filtration gap, so that the overall principal direction of flow of feed fluid in the fluid filtration gap is substantially the opposite of the overall principal direction of flow of feed fluid in the internal pathway of the inner member, both overall principal directions of flow being substantially parallel to the longitudinal axis of rotation.

In another aspect, the invention concerns a rotary filtration device for filtering feed fluid to remove permeate from the feed fluid, there being a reservoir of feed fluid having a fluid level, the device comprising:

a) an outer member having a lower end with an opening and an upper end with an opening;

b) a rotatable inner member (i) having a longitudinal axis of rotation, (ii) having an internal pathway for the flow of feed fluid, which pathway has a lower end and an upper end, and (iii) located at least partially within the outer member such that the outer member and the inner member form a fluid filtration gap therebetween into which the feed fluid to be filtered is placed;

c) rotation means for rotating the inner member about its longitudinal axis of rotation;

d) one or more filters facing the fluid filtration gap through which permeate passes from the feed fluid in the fluid filtration gap during filtration;

e) fluid connection means for fluidly connecting the fluid filtration gap to the internal pathway of the inner member;

f) fluid motive means for moving feed fluid through the fluid connection means during filtration from the fluid filtration gap into the internal pathway or from the internal pathway into the fluid filtration gap;

g) flow direction reversal means to reverse the direction of flow of feed fluid flowing during filtration from the fluid filtration gap into the internal pathway of the inner member or from the internal pathway of the inner member into the fluid filtration gap, so that the overall principal direction of flow of feed fluid in the fluid filtration gap is substantially the opposite of the overall principal direction of flow of feed fluid in the internal pathway of the inner member, both overall principal directions of flow being substantially parallel to the longitudinal axis of rotation, the upper end of the outer member being substantially fluidly sealed to the flow direction reversal means and the upper end of the inner member being spaced from the flow direction reversal means to provide a space in which the feed fluid can reverse its direction of flow; and h) means to at least temporarily maintain the outer member or inner member or both at least partially in the reservoir of feed fluid so that the lower end of the outer member or the lower end of the internal pathway of the inner member or both lower ends are below the fluid level of the feed fluid in the reservoir at least some of the time during filtration so that feed fluid can flow from the reservoir into the fluid filtration gap or into the internal pathway of the inner member during filtration.

In another aspect, the invention concerns a process of filtering feed fluid to remove permeate from the feed fluid, the process comprising:

a) providing a rotary filtration device in accordance with this invention;

b) placing feed fluid in the fluid filtration gap of the device;

c) causing the rotation means to rotate; and d) removing permeate from the feed fluid in the fluid filtration gap through the one or more filters of the rotary filtration device.

In preferred embodiments, the device is vertically oriented, i.e., the axis of rotation is vertical and overall direction of fluid flow in the fluid filtration gap is vertical; the outer member is stationary and carries a filter on its inner surface; the inner member and the outer member are both cylindrical; the fluid filtration gap is cylindrical; the internal pathway in the internal member is cylindrical; the fluid flow reversal means is a member to which the outer member is connected and more preferably is the inside surface of the top of the device; the rotation means rotates the inner member and more preferably also rotates an impeller located inside the inner member; the reservoir of feed fluid to be filtered is located in a vessel that has a top; the inner member is rotatably suspended from the top of the vessel; the vessel has an upper region for the flotation of material that is less dense than the average density of the feed fluid and also has a lower region for the settling of material that is more dense than the average density of the feed fluid; the device has means for creating and controlling the transmembrane pressure, including means for pressurizing the fluid filtration gap and/or means for withdrawing permeate; and/or the device has means for maintaining a difference between the pressure in the fluid filtration gap and the pressure in any reservoir of feed fluid into which the outer member is placed. Other preferred features of the invention will be apparent to one skilled in the art.

BRIEF DESCRIPTION OF THE DRAWINGS

To facilitate further description of the invention, the following drawings are provided in which.

Figure 1:
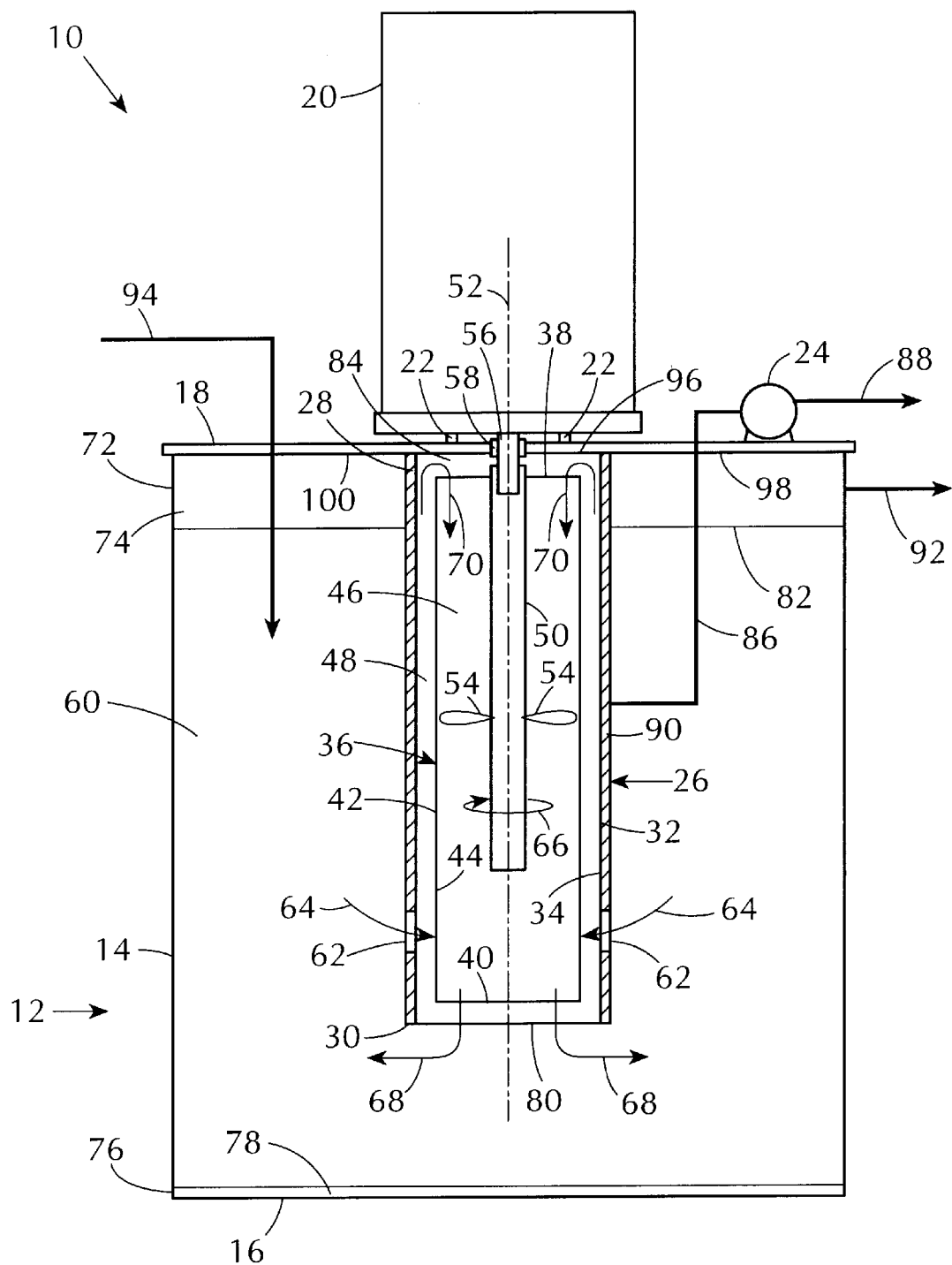
FIG. 1 is an elevational view of an embodiment of the invention in which the device has a stationary outer cylindrical member with a filter on its inner surface facing the fluid filtration gap; a rotatable cylindrical inner member; a cylindrical internal pathway in the inner member; an upper region in the vessel holding the reservoir of feed fluid to be filtered for the flotation of less dense material in the feed fluid; a lower region in the vessel for the settling of denser material in the feed fluid; and means for rotating the impeller inside the internal pathway so that feed fluid is drawn up from the reservoir of feed fluid and rises in the fluid filtration gap, hits the inside of the top of the vessel and thereby reverses its direction of flow, and flows down the internal pathway back into the reservoir of feed fluid.

These drawings are provided for illustrative purposes only and should not be used to unduly limit the scope of the invention.

DETAILED DESCRIPTION OF THE INVENTION

The design of the rotary filtration device of this invention is not critical and any design may be used so long as the device meets the requirements of the claims and affords the benefits of this invention. Broadly, the device has at least one inner member and at least one outer member, one or both of which rotate so that they rotate with respect to one another and which define a fluid filtration gap therebetween. There are one or more filters facing the fluid filtration gap and which are located either on the inner member or on the outer member or on both. During the filtration process, permeate passes from the feed fluid in the fluid filtration gap through the one or more filters. The inner member has an internal pathway for the flow of feed fluid.

In one embodiment, fluid from the reservoir (body) of feed fluid to be filtered flows from the reservoir of feed fluid through the internal pathway of the inner member, reverses direction, and then flows through the fluid filtration gap (typically in a direction perpendicular to the direction in which permeate is passing through the one or more filters) back to the reservoir of feed fluid. In another embodiment, fluid from the reservoir (body) of fluid to be filtered flows from the reservoir of feed fluid through the fluid filtration gap (typically in a direction perpendicular to the direction in which permeate is passing through the one or more filters), reverses direction, and then flows through the internal pathway of the inner member back to the reservoir of feed fluid. In another embodiment, the feed fluid circulates in either of the two foregoing ways but without being drawn directly from the reservoir or returning directly to the reservoir. Instead, the outer member is fluidly isolated from the reservoir of feed fluid (and the outer member may be pressurized as compared to the reservoir, e.g., by closing off the outer member and having it in fluid communication with the reservoir only through a pressure control valve, as in FIG. 3) and feed fluid is fed to the fluid filtration gap by, e.g., a pump. If the pressure in the fluid filtration gap becomes too high, the overpressure is relieved by allowing sufficient fluid in the outer member (including the fluid filtration gap) to leave, e.g., by returning to the reservoir through a pressure control valve.

The outer member may have any size or shape. Typically it will internally have a circular cross-section. Typically it will also internally have a right cylindrical shape. Although other shapes are possible (e.g., conical), cylindrical is preferred. The external shape of the outer member will also typically be cylindrical.

The inner member may have any size or shape. Typically it will externally have a circular cross-section. Typically it will also externally have a right cylindrical shape. Although other shapes are possible (e.g., conical), cylindrical is preferred. The internal shape of the inner member will also typically be cylindrical.

If, as is preferred, the outer surface of the inner member and the inner surface of the outer member are both cylindrical, the fluid filtration gap will be annular in cross-section.

The inner member has at least one internal pathway for the flow of feed fluid. Each pathway may terminate at the top of the inner member and at the bottom of the inner member, or a pathway may terminate at one or both ends in the side of the inner member. More than one pathway may be present in each inner member. The pathway may have any size or shape provided the benefits of this invention can be realized. Desirably, the inner member will have one pathway that terminates at the top and bottom of the inner member and that is cylindrical in cross-section.

The inner member will be at least partially (and desirably substantially completely) contained within the outer member, thereby forming a fluid filtration gap between them. Desirably a filter is mounted on the inner surface of the outer member. Also desirably, the outer member is stationary and the inner member is rotated. More than one inner member may be located within an outer member, although that generally will not be preferred.

The reservoir (body) of feed fluid may be contained in a man-made vessel (e.g., a holding tank, a fermentation tank)

or it may be contained in a natural vessel (e.g., a lake or pond). More than one inner-outer member pair may be mounted in each vessel. The vessel may have a top, and the top may fluidly seal the vessel (e.g., so that the vessel can be pressurized above or below atmospheric pressure). Each of the inner and outer members will typically be mounted directly or indirectly to the upper region of the vessel. For example, the outer member may be suspended from the top of the vessel, which is directly or indirectly mounted on (connected to) the upper region of the vessel. In some cases, the inner member or the outer member or both may be suspended from (connected to) a side or bottom of the vessel.

The vessel holding the reservoir of feed fluid may be part of the device. The vessel may be of any size or shape and of any material so long as the vessel does not adversely affect performance of the device of this invention. Generally, the vessel will be no larger than is reasonably required (1) to house the inner and outer members, and (2) to provide a sufficiently large reservoir (body) of feed fluid, and (3) to provide sufficient volume for flotation and/or settling (if flotation and/or settling are to be accomplished in the same vessel). A vessel need not be used at all or the vessel or a part of its bottom, top, and/or sides may be open and the device with the vessel may be placed into a reservoir of fluid (e.g., a lake, a fermentation tank) to produce a permeate and/or retentate product, e.g., for testing. Partial or complete immersion of the vessel can allow fluid to flow into the vessel and from there into the fluid filtration gap or internal pathway. The vessel may be completely filled with liquid or there may be headroom in the vessel above the topmost liquid level.

The inner and outer member (with or without a motor and/or permeate pump) may be mounted on a frame without a vessel, and the frame may be placed in a reservoir of feed fluid. The inner and/or outer members may be connected to a member (e.g., a top, a vessel, and/or a frame) from the top, bottom, or side. Thus, e.g., the outer member may hang down from the top of a frame and the inner member may be rotatably mounted at its lower end to the bottom of the frame.

To aid flotation and/or settling, means may be provided in the vessel (if a vessel is used) to reduce the velocity of fluid flow outside the fluid filtration gap. For example, a baffle may be used near the fluid inlet to the vessel. In a vertically oriented unit, a bottom baffle proximate the bottom of the inner and outer members may be helpful.

A device of this invention may be used in many different ways, e.g., for monitoring a reaction (e.g., by testing, or for producing a testable fluid from, the reaction medium in a reactor or a reactor effluent stream), or as an integral part of a reactor scheme (e.g., for separating catalyst from a reactor effluent stream for recycling to the reactor or for regeneration, or for continuously removing product and/or by-products and/or continuously replenishing nutrients in a cell culture reactor, or in biological waste water treatment (e.g., for retaining the activated sludge used to digest organic matter)), or as part of a recovery scheme (e.g., for separating products, by-products, contaminants, etc. from a reaction or process stream). The inner and outer members (with or without a vessel or frame) may be located in situ in any type of process vessel (e.g., reactor) or pipeline (e.g., reactor effluent piping or slip-stream piping) for any purpose (e.g., producing a testable fluid) where filtration needs to be performed continuously or intermittently.

A device of this invention may find particular use in recycling aqueous cleaners from oily waste waters, in point-of-use cleaner recycling, for coolant recycling in metal working industries, and in waste water treatment and minimization.

Although there are no theoretical upper or lower limits on the diameter of the inner and outer members, because of the speed of rotation, which may vary anywhere from under 50 rpm to 2500 rpm or higher, and because of engineering, fabrication, and cost constraints, the rotating member(s) of the filtration device will rarely be more than one or two meters in diameter and typically will be much smaller. In one embodiment using a closed vessel to hold the reservoir of feed fluid (substantially as shown in FIG. 1), the vessel is an 8-gallon cylindrical can about 14 inches (5.5 cm) in diameter and about 14 inches (5.5 cm) high. A one-quarter horsepower, 1725 rpm (revolutions per minute) motor is used to rotate the inner cylinder.

The combination of the inner and outer members may be oriented in any direction (i.e., the major axis of each may be vertical, horizontal, or at some other angle). The major axis of the inner and outer members need not be oriented in exactly the same direction but they typically will be. Desirably the inner and outer members (i.e., their major axes) will be vertically oriented although they need not be. Also desirably, the major axis of the inner member will lie along the same line as the major axis of the outer member, in other words, the two major axes will coincide. Desirably the fluid filtration gap will be vertically oriented although it need not be.

The device may comprise a vessel to which inner member and outer member are connected. The vessel may have a top from which the inner and outer members are suspended. The inner and outer members may be connected to a frame or other suspending system. For example, the inner and outer members may be connected to a frame some or all of which sits in the reservoir of fluid. The inner and outer members may be spaced from the outermost portion (e.g., the bottom) of the frame. The inner and outer members may be suspended from the side of the vessel. The inner and outer members may be completely submerged in the feed fluid or only one end of each may be in contact with the feed fluid. Thus, for example, the device may comprise a frame that can be placed into a lake and the inner and outer members may rise above the bottom of the frame. Furthermore, in the device, the outer member may be stationary and the inner member may be rotatably suspended (or mounted). In that case, the bottom edge or portion of each of the two members might be placed below the upper level of the lake so that the bottom end of the fluid filtration gap was below the upper level of the lake.

The inner and outer members need not terminate at the same points. For example, if the inner and outer members are vertically oriented, the bottom of the inner member may contain the bottom end of the internal pathway and that end may extend beyond the bottom end of the outer member. Thus, if the device were vertically oriented in a lake (e.g., mounted on a frame sitting in the lake or suspended from a floating member on top of the lake), the bottom end of the internal pathway of the inner member could extend substantially below the upper level of the lake and the bottom end of the outer member could be just slightly below (or above) the upper level of the lake. In that case, the feed fluid from the reservoir of feed fluid (the lake) could flow up the internal pathway, reverse its direction of travel, and flow down the fluid filtration gap and back into the lake. Such a device and flowscheme would encourage vertical mixing of the water in the lake.

The device may have fluid connection means for fluidly connecting the fluid filtration gap to the internal pathway of the inner member. In some embodiments, the feed fluid will flow from the fluid filtration gap to the internal pathway and in other embodiments, the feed fluid will flow from the internal pathway to the fluid filtration gap. The fluid connection means can be any means that allow the advantages of this invention to be achieved. Typically, the fluid connection means will comprise a fluid pathway inside the outer member but outside the inner member, for example, headroom or space 84 shown in FIGS. 1 and 2.

The device may have fluid motive means for moving the feed fluid in the fluid filtration gap to the internal pathway or vice versa. The fluid motive means can be any means that allow the advantages of this invention to be achieved. Typically, fluid motive means will be means that pump the feed fluid, e.g., an impeller within the inner member. If an impeller is used and the inner member rotates, the impeller desirably is rotated along with the inner member and preferably by the same means that rotates the inner member. Other fluid motive means include blades and/or a screw pattern on the surface of a rotating member, e.g., a helical screw on the inner surface of a rotating inner member. With that design, rotation of the inner member will thereby automatically pump feed fluid either up or down the inner pathway of the inner member, depending on the configuration and direction of rotation. More than one fluid motive means and more than one type of fluid motive means may be used. Thus, more than one impeller may be used, an impeller as well as a screw pattern on the surface of a rotating member may be used, etc. The one or more impellers may be located at any position on the rotatable shaft. If one or more impellers are used, at least one impeller is located near the distal end of the rotatable shaft (i.e., the end of the shaft away from the means for rotating the shaft, e.g., a motor) and most preferably as close to the distal end as possible. The reason for locating at least one impeller or other type of fluid motive means close to the distal end is explained below.

In some preferred embodiments, the distal end of the shaft will be located near the bottom of the reservoir of feed fluid. In some preferred embodiments, one or more impellers or other motive means will be used and at least one of them will be located near the distal end of the shaft. Thus, in some preferred embodiments, the distally located motive means will be located within 30 centimeters of the bottom of the reservoir of feed fluid, desirably within 20 centimeters of the bottom of the reservoir of feed fluid, more desirably within 10 centimeters of the bottom of the reservoir of feed fluid, preferably within 5 centimeters of the bottom of the reservoir of feed fluid, and most preferably within 2 centimeters of the bottom of the reservoir of feed fluid. Locations farther than 30 centimeters from the bottom of the reservoir of feed fluid and closer than 2 centimeters from the bottom of the reservoir of feed fluid may in some instances be used. Broadly speaking, fluid motive means (e.g., impeller) will be located as close to the bottom of the feed fluid reservoir as possible, consistent with the possible need to provide sufficient space above the bottom of the reservoir of feed fluid to allow settling of solids.

The device may have flow direction reversal means for reversing the direction of feed fluid flowing from the fluid filtration gap to the internal pathway of the inner member or from the internal pathway of the inner member to the fluid filtration gap. The flow direction reversal means may be any means that allow the advantages of this invention to be achieved. Typically, the flow direction reversal means will be a member against which the feed fluid impinges in its journey while flowing from one of the fluid filtration gap and internal pathway to the other. Thus, for example, the flow direction reversal means may be a plate inside the outer member and spaced from one end of the inner member. In that case, for example, when feed fluid flowing in the fluid filtration gap reached the end of the fluid filtration gap, it would hit the plate and be forced to reverse direction. The feed fluid would not flow back along the fluid filtration gap to any significant extent and would have no choice but to flow along the internal pathway of the inner member. Thus, for example, in FIGS. 1 and 2, bottom surface 100 of top 18 comprises the flow direction reversal means as shown by arrows 70.

Desirably, the flow direction reversal means may be part of (or help bound) the fluid connection means. Thus, in FIGS. 1 and 2, bottom surface 100 of top 18 comprises the flow direction reversal means and also bounds space 84.

The feed fluid flowing in the fluid filtration gap may flow in a direction that is substantially parallel to the longitudinal axis of rotation. The feed fluid flowing in the internal pathway may flow in a direction that is substantially parallel to the longitudinal axis of rotation. The overall direction of the internal pathway may be substantially parallel to the overall direction of the fluid filtration gap.

The overall direction of the internal pathway (and of feed fluid flowing in the internal pathway) is the major direction traversed by feed fluid flowing in the internal pathway and ignores, for example, microscopic motion of the fluid. In other words, the overall direction is the direction of bulk flow. The overall direction of the fluid filtration gap (and of feed fluid flowing in the fluid filtration gap) is the major direction traversed by feed fluid flowing in the fluid filtration gap and ignores, for example, microscopic motion of the fluid, any Taylor vortices or other similar flow phenomena, and ignores the removal of permeate from the feed fluid (the flow of permeate will typically be in a direction that is substantially perpendicular to the overall direction of feed fluid flow in the fluid filtration gap). In other words, the overall direction is the direction of bulk flow.

As used herein, the term "substantially parallel" means that the two lines or planes or elements or members or directions or fluid flow paths or pathways (e.g., the fluid filtration gap and the internal pathway of the inner member) that are "substantially parallel" do not form an angle with each other greater than about 40 degrees, desirably 25 degrees, more desirably 15 degrees, preferably 10 degrees, and most preferably do not form an angle with each other greater than about 5 degrees.

The term "oppositely disposed" means that, for example, two surfaces are on opposite sides of the same element, for example, the two major faces of a sheet of paper are oppositely disposed, or that two elements face one another across (and therefore help define) some gap or boundary. For example, the outer surface of the inner member of a device of this invention and the surface of a filter mounted on the inner surface of the outer member of a device of this invention are on opposite sides of a fluid filtration gap and are therefore oppositely disposed.

"Closely spaced" means that two lines or planes or elements are not so far apart that they can not interact or work together to perform a desired function. Thus, in the case of the facing surfaces of the inner and outer members, "closely spaced" usually means that those surfaces are typically not more than about 100 millimeters apart.

The overall principal direction of the flow of feed fluid in the fluid filtration gap may be substantially the opposite of the overall principal direction of the flow of feed fluid in the internal pathway. By "substantially the opposite" is meant that the vectors of the two directions when placed head to head form an angle of at least about 100 degrees and not more than about 260 degrees, more desirably an angle of at least about 120 degrees and not more than about 240 degrees, most desirably an angle of at least about 140 degrees and not more than about 220 degrees, preferably an angle of at least about 160 degrees and not more than about 200 degrees, more preferably an angle of at least about 170 degrees and not more than about 190 degrees, and most preferably an angle of about 180 degrees.

The fluid filtration gap may have any size or shape that allow the benefits of this invention to be achieved. A right cylindrical shape is preferred, but conical may also be used. The width of the gap may vary along the longitudinal axis. If the fluid filtration gap is annular in cross-section and substantially cylindrical, the various operating parameters and feed fluid may be such that at high enough rotational speed, Taylor vortices are established in the fluid filtration gap. That hydrodynamic fluid flow phenomenon is well-known and is described in more detail in, e.g., U.S. Pat. No. 4,790,942.

The filter may be made of any material so long as it can perform the functions required in accordance with this invention and is otherwise chemically and physically suitable under its respective operating conditions. Accordingly, the filter may be polymeric, metallic, ceramic, or of glass, and may be of any form or shape. Thus, the filter may be formed of particles or of a film or of fibers or of a combination of all three. The filter may be woven or non-woven. Generally, non-woven metal filters have certain advantageous features as compared with polymeric filters: they are easier to sterilize; generally have superior chemical and heat resistance; may be cleaned more easily; and have significantly better structural integrity and rigidity. If two or more filters are used in a device, they may be of the same or different material and filtration or sieving characteristics.

The filter used may be an asymmetric surface filter. An asymmetric surface filter is a filter whose two major faces have different distributions of pore sizes such that the average or median pore size on one face is significantly smaller than the average or median pore size on the other face. Desirably, the asymmetric surface filter is oriented in a device of this invention with the face having the smaller average or median pore size facing the fluid filtration gap and the face with the larger average or median pore size facing away from the gap. A preferred metal filter of this type is the DYNALLOY fiber metal filter marketed by Fluid Dynamics of DeLand, Fla. The use of a metal filter may be advantageous if one or more electric fields are also being used in the device or if the filter is to carry a charge.

One or more electric fields may be applied in axial, or radial, or non-radial non-axial directions. The fields may be useful in aiding separation and can be applied using known technology. As used herein, "axial" means along or parallel to the axis of rotation of the one or more rotating members and "radial" means along or parallel to a radius of a plane perpendicular to the axis of rotation of the one or more members. The field may be the result of direct or alternating voltage, e.g., a high frequency alternating potential. One or more fields in different directions may be applied, which together will result in a single imposed field. One or more fields may be varied as a function of time, e.g., one radial field and one axial field in interleaved on/off synchronization. Thus, the term "an electric field" as used herein should be understood to include all of the foregoing.

The key function of a filter is to freely pass the permeate and not pass the retentate. To do that efficiently, the permeate should adequately "wet" the filter. One indicator of wetting is the contact angle a drop of permeate forms when placed on the filter surface (see, e.g., U.S. Pat. Nos. 4,906,379 and 5,000,848). Generally speaking, the lower the contact angle, the greater the wetting, and, conversely, the larger the contact angle, the lesser the wetting.

A drop of permeate recovered using a device of this invention will usually have a contact angle on the filter used in that device of less than 45 degrees, desirably less than 40 degrees, more desirably less than 35 degrees, most desirably less than 30 degrees, preferably less than 25 degrees, more preferably less than 20 degrees, and most preferably less than 15 degrees. The contact angle is measured using the method described in U.S. Pat. No. 4,906,379 (see, e.g., column 10, line 42 et seq.) and U.S. Pat. No. 5,000,848 (see, e.g., column 12, line 46 et seq.).

Because water is a high energy liquid, principally because of hydrogen bonding, and because water is often a permeate in filtration processes, hydrophilic filters are preferred for use in the device of this invention. Filters whose surface energy has been increased to increase their hydrophilicity may be used. Thus, filters having a high surface energy (e.g., those of regenerated cellulose and those in accordance with U.S. Pat. No. 4,906,379) are a preferred class of filters. Such filters are more easily wet by polar substances, such as water, but resist wetting by non-polar substances such as organic hydrocarbon compounds. Such high energy filter surfaces also have a reduced tendency to become fouled by materials having low energy properties, such as proteins and other organic substances. Preferred filters used in this invention are made in accordance with U.S. Pat. No. 4,906,379 and are marketed by Membrex, Inc. under the trademark Ultra-Filic®. The UltraFilic® membrane is made of modified polyacrylonitrile (PAN) and its surface is chemically modified to be extremely hydrophilic ("hyperhydrophilic").

A device of this invention using a filter that allows water to pass (permeate) but rejects oil will find particular use in separating water from oil, e.g., in cleaning up oil spills or in recycling aqueous cleaning solution in a parts washing system. Alternatively, a filter that is relatively hydrophobic (low surface energy) and allows oil to pass and rejects water may be used. Other especially advantageous combinations of the device of this invention and filters having certain inherent properties (e.g., high rejection rate of certain materials but rapid and easy permeation of their co-components in the feed fluid) will be apparent to those skilled in the art. Use of such filters in combination with the device of this invention will provide advantages that may not be achievable without the combination.

The filter may have pores of any size or shape provided they are appropriate for the feed fluid and the permeate and can provide the separation desired. The filter may have a narrow or broad or other distribution of pore sizes and shapes and may be asymmetric and used as an asymmetric surface filter. The filter may have a relatively sharp molecular weight cut-off point.

The filter matrix, and particularly a polymeric filter matrix, may also have ligands attached to it for selective sorption applications (e.g., ion exchange/sorption, affinity sorption, and chelation). Suitable ligands include any ligand capable of attaching to the matrix or to a precursor or a derivative of the matrix.

Preferred ligands comprise (a) ion-selective affinity groups (such as chelator and cage types) that selectively bind inorganic ions and (b) bio-selective affinity groups that selectively bind biologically active substances. The inventory of affinity ligands is large and rapidly increasing. Most often, such ligands are derived from nature (i.e., substances of biological origin) while others are wholly or partially synthetic (i.e., bio-mimic substances). Preferred ligands, preferred methods for attaching ligands to membrane filters, and preferred membrane filters are taught in U.S. Pat. No. 4,906,379. Other useful ligands and methods for attaching the ligands to the filter will be known to those skilled in the arts of affinity sorption, enzyme immobilization chelation, and the like. As used herein the term "selective sorption ligands" includes all of the foregoing ligands.

Almost any fluid to be filtered can be filtered using a device of this invention, but it finds particular use in filtering feeds having high solids content, mixed phase fluids, and biological fluids.

High solids content fluids may be, for example, biological fluids, fluids containing affinity particles (e.g., selective sorption affinity particles), particles of ion exchange resin, catalyst particles, adsorbent particles, absorbent particles, and particles of inert carrier. The inert carrier particles may themselves carry catalyst, resin, reactants, treating agents (e.g., activated charcoal), etc.

Mixed phase fluids include liquid/solid, liquid/liquid, and liquid/gas systems. The fluid may contain more than two phases. The liquid phases may all be aqueous or non-aqueous or may be one or more aqueous phases and one or more non-aqueous phases together. The phases may be immiscible, e.g., two aqueous phases that are immiscible because each phase has a different solute. The fluid may have gaseous, liquid, and solid phases. Reaction and/or heat transfer may accompany the filtration process of this invention and take place inside or outside a device of this invention.

Biological fluids are fluids that originate from or contain materials originating from biological organisms (e.g., from the animal or plant kingdoms) or components thereof, including living and non-living things (e.g., viruses). Thus, the term "biological fluids" includes blood; blood serum; plasma; spinal fluids; dairy fluids (e.g., milk and milk products); fluids containing hormones, blood cells, or genetically engineered materials; fluids from fermentation processes (including fermentation broths and reactant, intermediate, and product streams from beer-making and wine-making, and waste water treatment streams); fluids containing or consisting of microbial or viral material, vaccines, plant extracts, or vegetable or fruit juices (e.g., apple juice and orange juice); fluids containing microorganisms (e.g., bacteria, yeast, fungi, viruses); and so forth. The device is particularly useful with fluids containing pressure-sensitive or shear-sensitive components, e.g., cells (blood cells; mammalian hybridomas; pathogens, e.g., bacteria in a fluid sample that are being concentrated to allow detection; etc.). It is useful for filtering fluids containing drugs and precursors and derivatives thereof. It is also useful for filtering organic compounds in general (including oils of all types, e.g., petroleum oil and food oil) as single or mixed phases (e.g., oil/water). It is also useful for filtering fluids containing surfactants, emulsions, liposomes, natural or synthetic polymers, waste waters from deburring and polishing operations (e.g., tumbling and grinding fluids), industrial and municipal waste waters, and aqueous, semi-aqueous, and solvent-based cleaners.

Thus, the feed fluid to be filtered may be selected from the group consisting of: fluids comprising a liquid phase and a gaseous phase; fluids comprising at least two aqueous phases; fluids comprising aqueous and non-aqueous phases; fluids containing at least one solid phase; fluids containing surfactants, emulsions, and/or liposomes; fluids containing a food, oil, and/or a petroleum product; fluids containing a drug or drug precursor; and biological fluids. The feed fluid may be a biological fluid selected from the group consisting of: biological fluids containing genetically engineered material; biological fluids resulting from a fermentation process; biological fluids containing microorganisms; biological fluids containing blood, blood serum, plasma, and/or blood cells; biological fluids containing a plant extract; and biological fluids comprising a vegetable or fruit juice. The feed fluid may contain materials that are denser than the average density of the feed fluid and/or the feed fluid may contain materials that are less dense than the average density of the feed fluid.

Rotation of each rotating member may be at a constant speed or at varying speeds and in a single direction or in alternating directions. If two or more members rotate, they may rotate in the same or different directions and at the same or different speeds. The rotating member(s) may periodically reverse its or their direction(s) of rotation (i.e., oscillate). At least one of each pair of inner and outer members defining each fluid filtration gap should rotate with respect to the other. Thus, the inner member and the outer member defining a fluid filtration gap should not rotate in the same direction and at the same speed. Preferably the filter (and therefore the outer member on which it is preferably mounted) is stationary and the inner member rotates and only in a single direction of rotation. Withdrawal of permeate that passes through the filter(s) is simplified if each member carrying a filter is stationary during filtration (being stationary generally eliminates the need to have rotary sealing means if permeate is being removed from the device during the filtration process). Thus, "rotating the inner member and outer member with respect to each other" includes for all of the foregoing (e.g., a stationary outer member and a rotating inner member, or a stationary inner member and rotating outer member, or both members rotating but not in the same direction at the same speed) and requires only that the one of the inner and outer members defining each fluid filtration gap rotate with respect to the other.

The inner member(s) and/or outer member(s) may translate axially (reciprocate) approximately perpendicular to the plane of rotation but that generally will not be preferred. The inner member(s) and/or outer member(s) may also be vibrated but that also will generally not be preferred.

Rotation of the inner and/or outer member(s) and/or fluid motive means may be achieved using any direct or indirect means, for example, an electric motor, a motor coupled via pulleys and drive belt or by gear transmission, or a magnetic drive. Thus, the rotating member(s) need not be mounted on a shaft that rotates them. Axial translation of the inner and/or outer member(s) and vibratory movement may be accomplished using known technology.

Each filter may lie on a filter support member. Each filter support member may be part of the inner and/or outer members facing the fluid filtration gap, or each filter support member may be a separate (whether or not removable) member that is adjacent to the surface of the respective inner or outer member. In any case, the filter support member will lie between the filter and the inner or outer member on which the filter is mounted. Thus, each of the phrases "one or more filters is mounted on the inner surface [of the outer member]" and "one or more filters is mounted on the outer surface [of the inner member]" includes all of those possibilities and does not require the filter to be in direct contact with the inner member or outer member.

The filter support member may be any element that supports the filter and allows the benefits of this invention to be achieved, and it may have any suitable size and shape, e.g., the filter support member may be a strong mesh element. Such a support member is desirable, particularly if the filter does not itself have substantial structural rigidity.

A network of permeate collection passageways may be disposed in fluid communication with the downstream side of the filter (facing away from the fluid filtration gap) so that the portion of feed fluid passing through the filter and becoming denominated as "permeate" flows into the permeate collection passageways. The network of permeate collection passageways may be in the filter support member and/or in the inner and/or outer members.

Typically, the filter will be mounted directly on the filter support member and any method of mounting may be used provided it does not unduly hinder operation of the device. Preferably, the method of mounting each filter does not significantly reduce the active filtration area of the filter but such reduction may be necessary in some cases. The filter may occupy only some of the area of the inner or outer member's surface facing the fluid filtration gap and need not extend to the end edges of the member.

The outer member may have various openings to allow feed fluid to flow into or out of the fluid filtration gap. In some embodiments, the only opening in the outer member will be the major opening near the end of the fluid filtration gap, e.g., opening 80 at lower end 30 of outer member 26 in FIGS. 1 and 2. In other embodiments, there will be one or more side openings, e.g., openings 62 in FIGS. 1 and 2. Whether feed fluid flows from the fluid filtration gap into the reservoir of feed fluid or vice versa depends on a number of factors, including the size, orientation, and location of the side openings, the speed of rotation and pressure developed in the fluid filtration gap, and whether there are flow restriction means associated with those side openings.

The number, size, and position of the openings in the outer member can be selected by one skilled in the art to reduce or minimize short circuiting of flow. Side openings in the outer member (e.g., indicated by reference numerals 62 in FIGS. 1, 2, and 4) help move fluid into or out of the fluid filtration gap. Those openings help reduce "short circuiting" in the following way. If there were no side openings 62 in, e.g., FIG. 1, all of the feed fluid entering the fluid filtration gap would have to enter through opening 80 at the lower end of the outer member. Thus, without those side openings, fluid that was leaving the bottom of the internal pathway 46 of the inner member (indicated by arrows 68), after having already passed up through the fluid filtration gap and down through the internal pathway, might immediately be sucked back up into the entrance to the fluid filtration gap (located at the bottom of the device). However, with side openings 62 allowing "fresh" feed fluid from the reservoir (away from the discharge of the internal pathway) to flow into the fluid filtration gap, the amount of "used" feed fluid leaving the internal pathway that immediately gets sucked back up into the fluid filtration gap is significantly reduced. Similarly, in FIG. 2, providing side openings 62 allows "used" feed fluid to flow out into the reservoir of feed fluid at locations away from the bottom entrance to the internal pathway, where "fresh" feed fluid is entering the device, as indicated by arrows 68. Accordingly, the presence of such side openings helps decrease short circuiting of fluid and helps promote better mixing of the feed fluid in the reservoir.

Feed fluid flowing from the fluid filtration gap into the reservoir of feed fluid may enter the reservoir of feed fluid with a significant rotational velocity component imparted by the rotation of, e.g., the inner member. That will tend to cause the fluid in the reservoir of fluid radially outside the outer member to rotate in the same direction as the fluid in the fluid filtration gap is rotating. Rotation of that radially distant fluid, which rotation can be quite vigorous, will in turn tend to make it more difficult to accomplish flotation of less dense materials or settling of denser materials. Consequently, controlling the flow from the fluid filtration gap into the reservoir of feed fluid may be desirable. One way to do that is to direct the effluent flow against the direction of rotation. That will tend to counteract that rotational velocity component of fluid leaving the fluid filtration gap through, e.g., openings 62 in FIGS. 1 and 2 and decrease the tendency of the radially distant fluid to mix or rotate. Accordingly, means for directing the flow of fluid leaving the fluid filtration gap may be nozzles pointed against the direction of rotation. Orienting the openings themselves against the direction of rotation may also be helpful.

The outer member may be thought of as forming a wall separating a regime of more intense shear and fluid movement (the fluid between the inner and outer members, which is the fluid in the fluid filtration gap) from a regime of less intense shear and fluid movement (the rest of the body of fluid, including any volume radially distant from the outside surface of the outer member.

In most cases, it is desirable for feed fluid reentering the reservoir of feed fluid from either the fluid filtration gap or the internal pathway to remix with the rest of the feed fluid. Such remixing is desirable for several reasons, including to prevent extreme concentration gradients from arising and to "wash out" from the fluid filtration gap the solids or other materials that might otherwise tend to accumulate and more rapidly blind or clog the filter.

Feed fluid may be introduced into the reservoir of feed fluid (indicated by reference numeral 60 in FIGS. 1, 2, and 3) continuously or in batches. Permeate may be removed continuously or in batches but desirably is removed continuously. The various fluids may be moved by pumps or by gravity or by any other method that allows the benefits of this invention to be achieved. Thus, in FIGS. 1 and 2 fresh feed fluid entering through flowline 94 may be pumped into vessel 12 or may flow by gravity, e.g., from another vessel.

The permeate product may be feed fluid from which particulate or other matter that would interfere with subsequent testing has been removed by the filtration device. Testing of the various fluids in the system (e.g., permeate) may be for the presence of or concentration of any chemical or biological species or for one or more physical or chemical properties (e.g., pH, temperature, viscosity, extent of reaction, specific gravity, chloride ion, antibodies, bacteria, viruses and other microorganisms, e.g., Cryptosporidium oocysts and Giardia cysts, DNA fragments, sugars, ethanol, and toxic metals, toxic organic materials, and the like). Thus, a device of this invention may further comprise means for physically and/or chemically testing the retentate and/or the permeate, e.g., for one or more of the foregoing species and/or properties (characteristics).

A device of this invention may further comprise means for recycling the permeate (after it has been tested) back to the reservoir of feed fluid. A device of this invention may also be designed and operated so as to encourage mixing of the reservoir of feed fluid before filtration occurs (i.e., permeate is withdrawn). For example, a device could be used in which the inner member and its internal pathway extend well below the bottom of the fluid filtration gap and feed liquid flows up the internal pathway and down the fluid filtration gap. That device could be operated for a long enough period of time to insure good mixing in the reservoir of feed fluid and then permeate could be withdrawn. This also illustrates that in this invention, the withdrawal of permeate has been significantly decoupled from the overall flow of fluid through the fluid filtration gap (except perhaps for any shear and cleaning of the filter resulting from such overall flow through the fluid filtration gap).

In some embodiments, one member or element may be suspended from another member or element (e.g., the outer member be suspended from the top of the vessel). Also, one or more of the inner and outer members rotate during filtration, and the rotating member(s) or element(s) may be rotatably suspended from, e.g., the top. Thus, a "rotatable suspension" may be used for rotatably suspending, e.g., the inner member from the top member. The rotatable suspension will typically suspend a rotatable shaft carrying the one or more rotating members (e.g., the inner member). The rotatable suspension may be any suitable means, for example, bearings, lip seals, dynamic seals, bushings, packing, or packing glands. Even though the device need not be oriented vertically, it typically will be and the rotatable suspension will preferably be above the normal level of the reservoir of fluid to be filtered, thereby eliminating the need for rotary seals and allowing a generally simpler, less costly, and less critical type of rotatable suspension (e.g., a simple rotary bearing) to be used.

In some cases the rotatable suspension may be the bearings in or associated with a gear box, motor, or other rotation means. For example, a device may have a stationary outer member carries a filter and that is suspended from the lower surface of the top of the device, the inner member may be attached to a vertical rotatable shaft, the shaft may be connected directly or indirectly to a motor or other motive means that is attached to the upper surface of the top of the device, and the rotatable shaft may pass through a bearing located in a hole cut in the top of the device. In that case, the rotatable suspension may be thought of as comprising the bearings associated with the motor and the bearing in the top of the device. The rotating member(s) may also be coupled for rotation to the rotation means (e.g., motor) without any through-hole in a solid member (e.g., a top) between them. That may be accomplished using, e.g., a magnetic coupling.

The term "suspended from" should be understood to include being attached to, being secured to, depending from, and/or hanging from; should also be understood to include cantilevered suspension; and should also be understood to include suspension that results in any spatial orientation (whether vertical, horizontal, or diagonal); and should also be understood to include both direct and indirect suspension (e.g., with one or more connecting members in between, by magnetism).

In contrast to classic cross-flow filtration devices, the shear rate near the filtration surface and the transmembrane pressure or transmembrane pressure differential ("TMP") in a device of this invention may be made substantially independent of one another. (Despite the fact that the filter used herein need not be a membrane, the term "transmembrane pressure" is used because it is a common term.) A filter system of this invention enables precise control over the separation and can be operated and controlled in a variety of ways. For instance, for a given feed fluid, device geometry, filter, and rate of rotation of the rotating member, the permeate flow can be controlled by a permeate withdrawal (metering) pump (e.g., a peristaltic pump). Control of the system can also be achieved with flow control valves and pressure control valves. Some of the advantages of this invention are made possible by the fact that key operating parameters (shear rate, transmembrane pressure, feed fluid flowrate in the fluid filtration gap and internal pathway of the inner member, and permeate flowrate) can to a substantial extent be independently controlled and manipulated.

The control system for the filtration device may provide for continuous or batch addition or withdrawal of feed fluid and/or permeate. The design of the peripheral equipment used with the filtration device is not critical. Off-the-shelf technology may be used for the addition, collection, and withdrawal of fluid, for the control system, the rotary drive means, etc. The design and selection of all of this peripheral equipment are within the skill of the art.

The pressure in the fluid filtration gap is the upstream pressure on the filter. The pressure on the downstream side of the filter may be any pressure and in some embodiments will be approximately atmospheric. The downstream pressure in the filter can be decreased by, for example, using a vacuum pump to remove permeate. Whether or not a permeate vacuum pump is used, it is the pressure differential across the filter (the transmembrane pressure) that drives the filtration. Thus, in some cases it may be desirable to increase the upstream pressure on the filter (and perhaps to also use a permeate vacuum pump) to obtain as high as transmembrane pressure as possible.

Increasing the transmembrane pressure can be accomplished, e.g., by pulling a vacuum on the downstream face of the filter and/or by pressurizing the fluid filtration gap. In some embodiments, the fluid filtration gap is in direct pressure communication with the reservoir of feed fluid and, therefore, pressurizing the fluid filtration gap will also require pressurizing the vessel in which the reservoir of fluid is located. In other embodiments, the device may have means for pressurizing the fluid filtration gap to a pressure different from the pressure in the reservoir of feed fluid. That may be accomplished, for example, by closing the outer member so that it is not in pressure communication with the reservoir of feed fluid except through a pressure control valve and by pumping feed fluid directly into the fluid filtration gap at a pressure at or above the set point of the pressure control valve.

Generally, the operating pressure and transmembrane pressure in the device can be any values that do not interfere with the filtration process or adversely affect the feed or permeate. Thus, an operating pressure only slightly above atmospheric pressure may be used or the operating pressure may be substantially higher. Generally, low transmembrane pressures are preferred because they tend to minimize solids build-up on the surface of and within the filter. Also, lower operating pressures are generally preferred because they tend to make the equipment less costly. However, in some cases it may be desirable to use higher operating pressures to aid filtration. For instance, when processing carbonated beverages, the operating pressure must be kept sufficiently high to prevent degassing. Higher pressures in the fluid filtration gap may also be desirable to help drive the filtration. Higher pressure in the fluid filtration gap may also allow dispensing with a vacuum pump for removing permeate. It may also be desirable to use other forces, for example, electromotive force, to aid filtration in certain cases.

The separation between the two surfaces defining the filtration gap and the speed of rotation affect the cleaning action or shear and, hence, the flux. The cleaning action, generally speaking, is inversely related to the gap width. The effect of varying the width of the fluid filtration gap, at least within a certain range, has a measurable but relatively small effect on flux, that is, the relationship between gap width and wall shear (i.e., shear rate at the filter surface) is generally not strong (unless, e.g., varying the width changes the flow regime from one with Taylor vortices to one without Taylor vortices). In any case, at some point, the gap width will be too great for rotation of at least one of the members to have any beneficial effect on flux. On the other hand, because of engineering tolerances, among other things, at some point the two surfaces defining the filtration gap will be too close together to allow rotation of one or the other or both members. Accordingly, there is a useful working range of gap widths for any particular filtration device for a given feed fluid. The two oppositely disposed surfaces defining the fluid filtration gap should be "closely spaced" and thus the gap width will usually be within the range of 1 to 100 millimeters, often 1 to 50 millimeters, desirably 1 to 25 millimeters, preferably 1 to 15 millimeters, and most preferably 1 to 10 millimeters. Spacings outside the range of 1 to 100 millimeters may be used if the other parameters can be adjusted so that the benefits of this invention are obtained. The gap width for a given device may vary along the length of the fluid filtration gap although that will generally not be preferred.

The speed of rotation affects the flux: higher rotation rates increase the cleaning action and lower rotation rates decrease the cleaning action. Any speed of rotation may be used that is consistent with the design of the equipment and the shear-sensitivity of the fluid being processed. The speed will usually be from 50 to 2500 rpm (revolutions per minute) and preferably from 100 to 2000 rpm. Values outside the range of 50 to 2500 rpm may be used provided the benefits of this invention can still be achieved.

Other variables affecting the performance of the device of this invention include, e.g., the smoothness of the surfaces defining the filtration gap and the parameters defining fluid rheology, including fluid viscosity, density, whether it contains particles (e.g., cells), and the size, shape, and concentration of those particles.

With this background, we turn to the accompanying drawings, which illustrate various embodiments of the present invention.

In FIG. 1, rotary filtration device 10 comprises vessel 12 having sidewall 14 and bottom 16. Top 18 sits atop the vessel and fluidly seals it. Motor 20 is connected to top 18 and is spaced therefrom by motor mounts 22. Permeate withdrawal pump 24 is also mounted on top 18. Vessel 12 holds reservoir 60 of feed fluid.

Cylindrical outer member 26 is suspended from and fluidly sealed to bottom surface 100 of top 18. Member 56, which is an extension of the motor shaft (not shown), passes through rotary bearing 58 in top 18. Rotary bearing 58 is fluidly sealed so that fluid cannot pass up through the bearing and out of the vessel. Member 56 is connected to shaft 50 on which impeller 54, which is schematically shown, is mounted. Connection may be by a cam-lock mechanism (which is preferred), by bayonet means, by connectable flanges, or by any other suitable means such as quick-connect pipe fittings. Cylindrical inner member 36 is also connected to shaft 50 by, e.g., several spokes (not shown) radiating outwardly from the shaft. Thus, when the rotor of motor 20 turns, member 56 rotates, thereby rotating impeller 54 and inner member 36, all of the rotation occurring around longitudinal axis 52.

Outer member 26 has upper end 28 having circular upper opening 96, lower end 30 having circular bottom opening 80, and cylindrical inner surface 32 on which filter 34 is mounted. Fluid filtration gap 48 is defined by oppositely disposed outer surface 42 of inner member 36 and filter 34 (or inner surface 32 of outer member 26.

Permeate is removed from outer member 26 using permeate collection means 90 located under the filter and within the outer member. Permeate is drawn from outer member 26 through flowline 86 by pump 24 and leaves the system in flowline 88.

Inner member 36 has upper end 38, lower end 40, cylindrical outer surface 42, cylindrical inner surface 44, and cylindrical internal pathway 46 running from a circular opening at upper end 38 to a circular opening in lower end 40.

Vessel 12 has upper region 12 and lower region 76. Lower density fluid 74 (e.g., low density hydrocarbon such as cleaning substances and any entrained gas) rises to upper region 12 and floats atop the main portion of the reservoir of feed fluid. Higher density material 78, e.g., metal filings and other solids, settles in region 76. Lower density fluid 74 forms interface 82 with the main portion of the fluid in the vessel and has upper level 98, which is adjacent to lower surface 100 of top 18. Lower density fluid 74 is bled from the system via flowline 92 to prevent interface 82 from moving too far down the vessel as more lower density material continues to enter vessel 12. Because outer member 26 is fluidly sealed to lower surface 100 of top 18 at upper end 28, lower density material does not flow into the outer member or fluid filtration gap 48 from the floating layer of lower density material 74.

Some lower density material (e.g., gas) entering the system in the feed fluid via flowline 94 may possibly enter the fluid filtration gap by being swept through the entry openings (e.g., opening 80) near the bottom of the system, and any such material may be bled from inside the outer member at the top into layer 74 using any suitable one-way flow system (e.g., a membrane that allow gas to pass but not liquid). It is important that gas and other lower density material that rises within and become trapped inside the top of outer member 26 be bled from the outer member to prevent the system from losing too much active filtration area and from having flow-reversal space 84 become "air bound" or "blocked" (occupied by the gas or other low density material) and thereby become unable to fulfill its function of allow reversal of the flow of feed fluid.

In FIG. 1, rotation of impeller 54 in the direction of rotation indicated by arrow 66 causes fluid to flow upwardly in fluid filtration gap 48. Permeate passes from the feed fluid in the fluid filtration gap through filter 34. When the upwardly flowing feed fluid hits bottom surface 100 of top 18 within outer member 26, that fluid reverses direction in space 84 and starts to flow downwardly in internal pathway 46, as shown by arrows 70. The feed fluid in the internal pathway continues to flow downwardly until it leaves the bottom of inner member 36 and then bottom 30 of outer member 26. That exiting feed fluid then reenters the reservoir of feed fluid, as shown by arrows 68. During this process, feed fluid from reservoir of feed fluid 60 also enters fluid filtration gap 48 through openings 62 in outer member 26 as shown by arrows 64. Openings 62, if used, may be located at any place along outer member 26 that allow the benefits of this invention to be achieved. The number of such openings may also be varied. Depending on a number of factors, feed fluid may either flow into or out of those openings.

Figure 2:
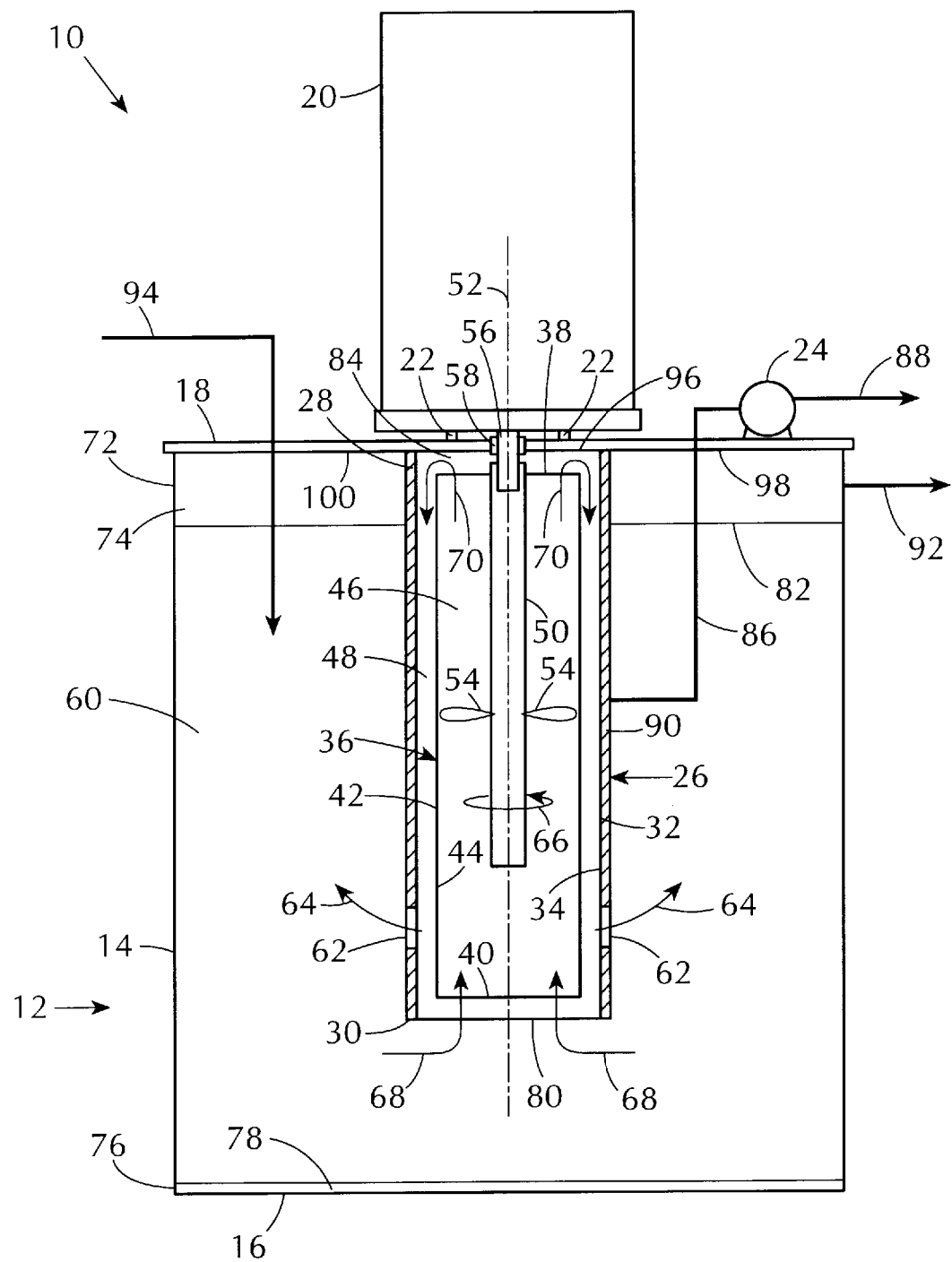
FIG. 2 is an elevational view of a device that is substantially the same as the device of FIG. 1 but arranged to rotate the impeller in a direction opposite to the direction of rotation of the device in FIG. 1 so that feed fluid is drawn up from the reservoir of feed fluid and rises in the internal pathway within the inner member, hits the inside of the top of the vessel and thereby reverses its direction of flow, and flows down the fluid filtration gap and back into the reservoir of feed fluid.

FIG. 2 is essentially identical to FIG. 1 except that in FIG. 2, the direction of rotation of shaft 50 and therefore of impeller 54 and inner member 36 is the opposite of the direction of rotation in FIG. 1 as may be seen by comparing arrows 66 in the two drawings. The result of this reverse rotation is to cause feed fluid to enter internal pathway 46 from reservoir 60 of feed fluid and flow upwardly in internal pathway 46 until the feed fluid hits bottom surface 100 within outer member 26. That causes the feed fluid to reverse direction in space 84 and flow downwardly in fluid filtration gap 48, as shown by arrows 70. Permeate leaves the feed fluid in the fluid filtration gap by passing through filter 34. The rest of the feed fluid continues to flow downwardly into the reservoir of feed fluid. The reverse rotation of the shaft (reversed as compared to the direction of rotation in FIG. 1) also causes feed fluid to flow out of the fluid filtration gap through openings 62 in the outer member into the reservoir of feed fluid, as shown by arrows 64.

Figure 3:
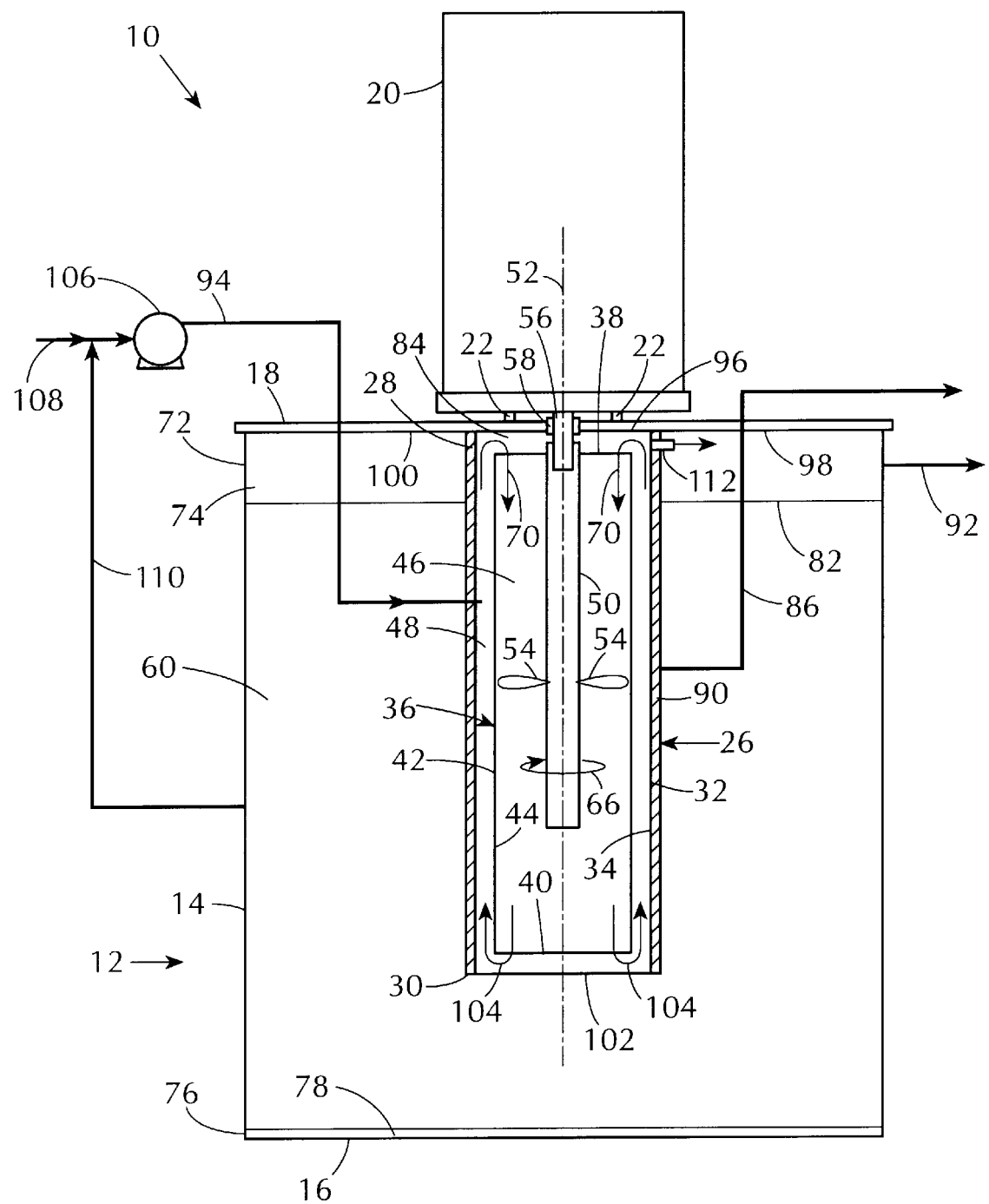
FIG. 3 is an elevational view of a device that is similar to the devices of FIGS. 1 and 2 but having a closed outer member so that it can be pressurized by feed fluid fed to the fluid filtration gap by a feed pump and also having other differences that will be discussed below.

FIG. 3 is similar to FIGS. 1 and 2 but with the following differences. Opening 80 in the bottom of outer member 26 and openings 62 in the sidewall of outer member 26 have been eliminated. Thus, feed fluid flowing downwardly in internal pathway 46 will hit the inside surface of completely closed bottom 102 and reverse direction to flow upwardly in the fluid filtration gap as shown by arrows 104. Feed pump 106 pumps a combined feed flow through flowline 94 directly into fluid filtration gap 48. The combined feed flow in flowline 94 is a combination of the fresh (make-up) feed in flowline 108 and recycle feed fluid returning from vessel 12 through flowline 110. If the pressure near the top inside of the outer member (which is essentially the same as the pressure in the fluid filtration gap and in the internal pathway of the inner member, except for differences due to, e.g., fluid flow and hydrostatic head) increases above the set point of pressure control valve 112, that valve opens and allows feed fluid to flow back into the reservoir of feed fluid, as shown by the arrow running from the exit of control valve 112 into layer 74 of less dense fluid. When the pressure in the outer member decreases below the set point of pressure control valve 112, the valve closes and no further feed fluid flows from the outer member into vessel 12 unless and until the pressure in the outer member increases above the set point. Because vessel 12 is completely fluid filled, fluid leaving the outer member/inner member combination through pressure control valve 112 will force feed fluid to leave vessel 12 through recycle flowline 110.

Figure 4:
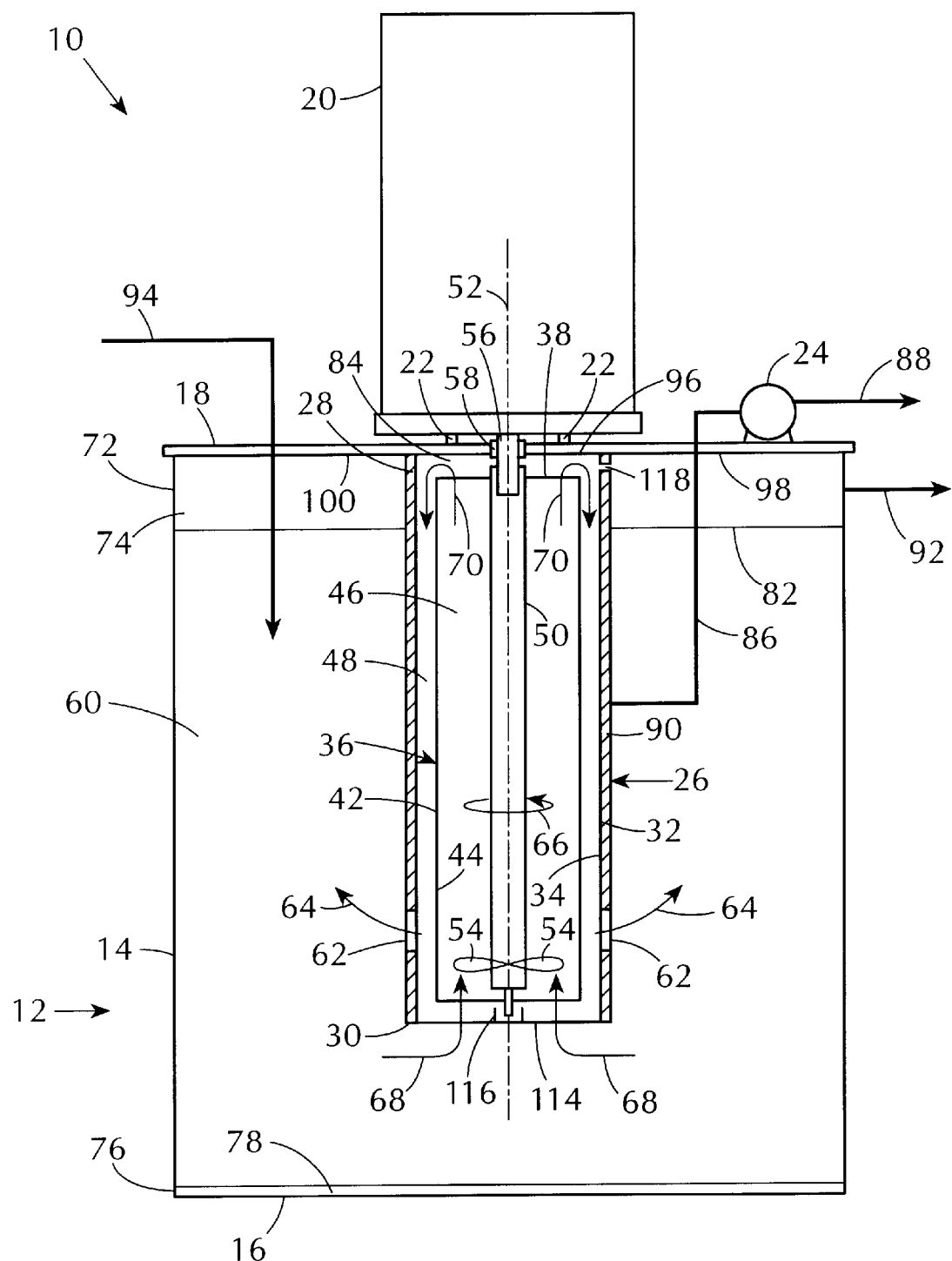
FIG. 4 is an elevational view of a device that is similar to the device of FIG. 2 but in which the impeller is located near the bottom of the rotatable shaft and in which a bottom bearing has been added to provide extra stability for the rotating inner member and guard against undesirable lateral movement of the bottom of the inner member during rotation.
Figure 5:
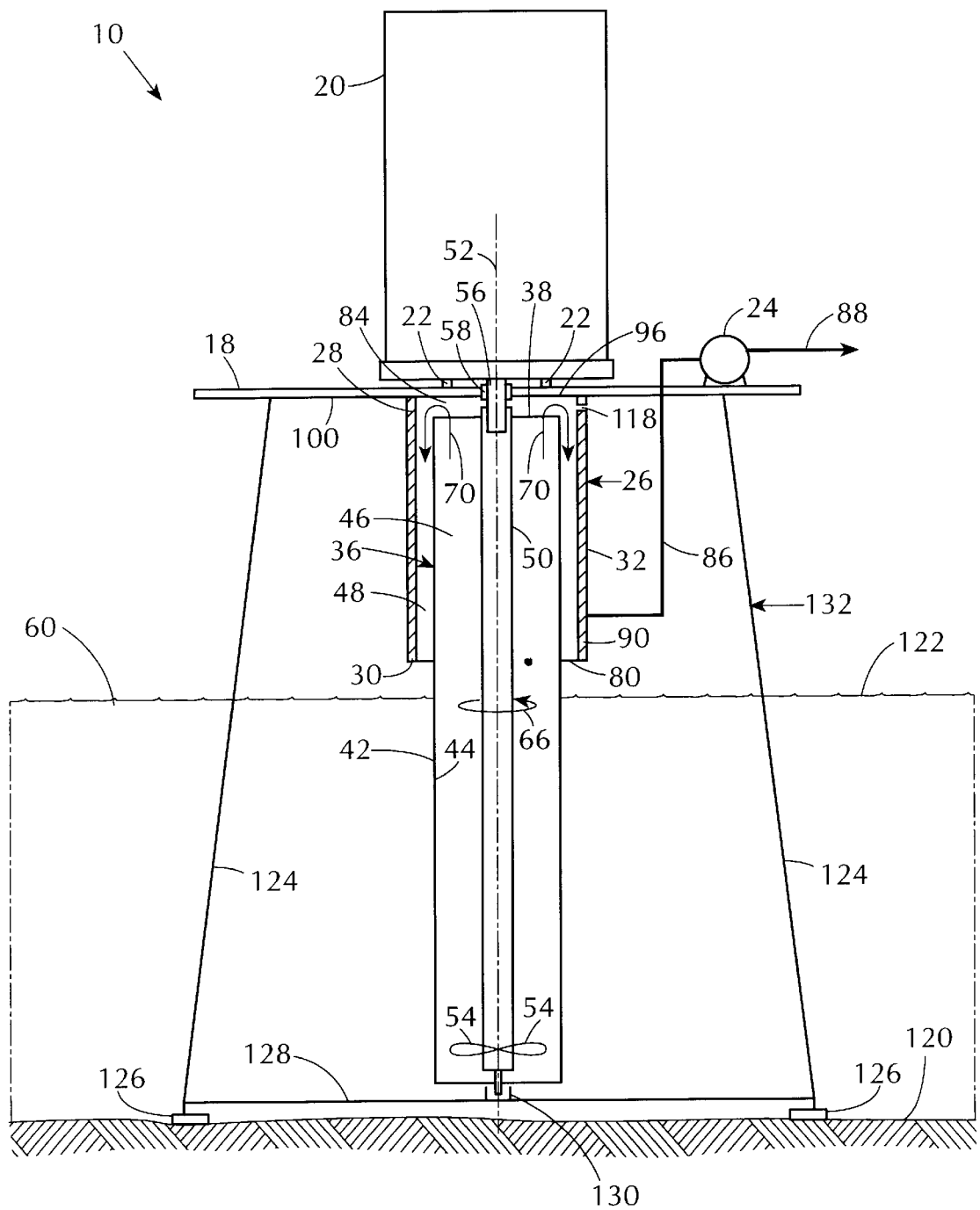
FIG. 5 is an elevational view of a device mounted on a frame that is sitting in a body of water (reservoir), the device having an inner member whose lower extent is near the bottom of the body of water and whose outer member is much shorter than the inner member, the lower extent of the outer member being above the uppermost level of the body of water.

Although not shown, the device of FIG. 3 may have a rotary bearing mounted at the center of the inside of bottom 102 on which inner member 36 rotates (e.g., a bearing similar to bearing 116 in FIGS. 4 and 5). Therefore, inner member would be rotatably mounted at both its top and bottom, thereby providing increased stability and freedom from lateral movement during rotation as compared to an inner member that was rotatably mounted at only one point. Similarly, even if the bottom of outer member 26 is open (as in FIGS. 1 and 2), a cross-piece or other member spanning the bottom opening may be used and a bottom rotary bearing to be connected to the bottom of the inner member 36 affixed thereto. In some cases, the upper rotatable mounting may be omitted and only a bottom rotary bearing used. In that case, a submersible motor or other rotation means driving the rotatable member(s) from the bottom could be used. However, in most cases, configurations such as shown in the accompanying figures will be preferred.

The pressure in fluid filtration gap may be controlled by selecting the desired delivery pressure of feed fluid into the fluid filtration gap by pump 106, by selecting a desired set point of pressure control valve 112, and by setting the desired back-pressure on permeate withdrawal flow 86. Setting those pressures also determines the transmembrane pressure on filter 34, because that pressure differential is the difference between the pressure in the fluid filtration gap and the filter downstream pressure, and the downstream pressure is determined by setting the desired back-pressure on permeate withdrawal flow 86. In this embodiment, the fluid filtration gap may be pressurized and a high transmembrane pressure used independent of the pressure in surrounding vessel 12. Thus, fluid filtration gap 48 may be pressurized well above atmospheric pressure but vessel 12 need not be a pressure vessel.

Any suitable means may be used for isolating the pressure in the outer member (and fluid filtration gap) from the pressure in any reservoir of feed fluid into which the outer member may be partially or completely immersed. For example, a completely closed outer member (except for the pressure/fluid communication provided by pressure control valve 112) may be used.

In FIG. 4, outer member 26 is open at the bottom, as in FIGS. 1 and 2. Cross-piece 114 runs along a diameter between two oppositely disposed points on the circumference of lower end 30 of outer member 26. There may be more than one cross-piece and the cross-pieces may form an "X" or be in a spoked wheel configuration or in any other suitable configuration. Any type of cross-member or cross-members may be used. Instead of a member that runs from one side of the lower end to the other, a cantilevered member may extend towards the middle from just one side of the circumference. Bearing 116 (a pin and bushing combination), which is schematically represented, is connected to the middle of cross-piece 114. Any mechanism fixing the rotating member but allowing its rotation may be used, and the terms "bearing" and "rotatable bearing" should be understood to include all such mechanisms. One of the advantages of using a bottom bearing is the lateral stability it provides to the inner member during rotation, i.e., the bearing prevents larger than desired lateral movement of the bottom end of the rotating member. Such lateral movement might put undue stress on the top bearing and in any case would tend to make the otherwise symmetrical annular fluid filtration gap asymmetrical (because the inner member would be closer to the outer member at one point and farther away from the outer member at the diametrically opposite point). In fact, without a bottom bearing, the lateral excursions of the lower end of the inner member might in some cases be sufficient to cause the lower end of the inner member to contact the inside of the outer member, with possible ensuing damage. If the outer member rotates, a bottom bearing (in addition to a top bearing) may be used. If both the inner and outer members rotate, each may have a top and a bottom bearing.

In FIG. 4, the distal end (in this case, the lower end) of shaft 50 extends almost to the bottom of inner member 36, and part of rotatable bearing 116 (e.g., in this case, the pin) is connected to the bottom of the shaft. Impeller 54 is located near the bottom of the shaft. A significant advantage of having the impeller located as near as possible to the bottom of the reservoir of feed fluid is that a greater proportion of the feed fluid will be able to be processed by the device. That is because rotation of the impeller can keep internal pathway 46 and fluid filtration gap 48 filled with fluid as long as impeller 54 remains submerged in feed fluid. Thus, the device will be able to process as much of the feed fluid as possible while keeping the fluid filtration gap filled and the membrane wet even if the level of feed fluid drops lower and lower in the reservoir of feed fluid. Also, if there is any circumstance, e.g., a process interruption such as a power loss, that allows the feed fluid level to drop below the most distal of the motive means (e.g., an impeller), it will be impossible to resume processing without some sort of intervention (e.g., external priming of the system) because the motive means will not be able to cause the fluid to flow through the internal pathway and fluid filtration gap. As indicated above, the distal impeller may be located 2 centimeters or less from the bottom of the reservoir of feed fluid or the distal impeller may be located 30 centimeters or more from the bottom of the reservoir of feed fluid or at any place in between.

The device of FIG. 4 also has small vent hole 118 located near the top of the outer member. The vent hole allows entrained low density substances (e.g., gas) to leave the top inside of the outer member, where they would otherwise remain trapped and might significantly interfere with operation of the device. For example, if significant quantities of entrained gas entered the outer member, the flow of liquid up the internal pathway and down the fluid filtration gap might not be sufficient to sweep out the entrained gas and prevent its accumulation. If enough accumulated, the device might become "gas bound," that is, the liquid flowing up inner pathway 46 would not be able to rise high enough to make the "U-turn" indicated by arrows 70 and flow down the fluid filtration gap. Vent hole 118 is small enough so that it acts to some extent as a restriction orifice. Thus, it will allow the pressure in space 84 (resulting from the force of the flowing fluid) to remain higher than the pressure in the liquid outside the outer member (i.e., in less dense fluid 74) and prevent that liquid from flowing from the reservoir back through the vent hole into space 84.

In FIG. 5, top 18 and all the parts of the device connected thereto (motor 20, outer member 26, inner member 36, etc.) rest on frame 132, which comprises a multiplicity of legs 124. The bottom of each leg 124 terminates with foot 126, each of which rests on bottom 120 of a lake (reservoir 60 of feed fluid) having upper level 122. Two intersecting cross-pieces 128 (only one of which is shown) connect legs 124 together and help rigidify and thereby stabilize the frame. The bushing of pin-bushing bearing 130 is mounted on the two cross-pieces 128 near their centers. Frame 132 is schematically represented, its design is not critical, and any design (shape and number of legs, footings, etc.) may be used that allows the benefits of this invention to be realized.

Inner member 36 is substantially longer than outer member 26. Shaft 50, which extends almost to the bottom (distal end) of inner member 36, has the pin of bearing 130 attached to its bottom (distal end). Impeller 54 is located near the bottom of the shaft. Rotation of shaft 50 simultaneously rotates both inner member 36 and impeller 54, resulting in lake water being forcibly pushed up internal pathway 46. Lower (distal) end 30 of outer member 26 terminates above fluid (lake) level 122. The flow of feed fluid up internal pathway 46, through space 84 (where the fluid makes a "U-turn"), and down fluid filtration gap 48 is so high that the fluid filtration gap remains completely filled with feed fluid even though lower end 30 is above liquid level 122. In other words, the feed fluid in the fluid filtration gap does not "fall out." One advantage of having the inner member extend so far down and terminate near the bottom of the lake is that the feed fluid drawn up the internal pathway will be more representative of the fluid near the bottom of the lake. In some embodiments, the inner member may be replaceable with inner members of different lengths. Thus, after sampling fluid near the bottom of the lake with the device as shown in FIG. 5, long inner member 36 could be removed and replaced with successively shorter inner members, thereby allowing lake water at different depths to be sampled. It might in some cases be preferable to start such stratified sampling with the shortest inner member and then to use successively longer inner members because that might tend to cause less intermixing of the different strata prior to sampling.

The many advantages of this invention should be apparent to those skilled in the art. For example, the flow of fluid in the fluid filtration gap (vertical overall flow in the embodiments of the figures) helps clean the filter (i.e., it provides shear), regardless of whether Taylor vortices or other shear-providing fluid flow phenomena are present in the fluid filtration gap. The rate at which the feed fluid flows past the filter is determined by a number of controllable factors, including the width of the fluid filtration gap, the design and position of the fluid motive means (e.g., impellers 54), and the force provided by the fluid motive means (e.g., the speed of rotation of impellers 54).

Generally speaking, and depending on the particular design of the device, the fluid filtration gap may be kept sufficiently filled, the filter kept in contact with feed fluid, and the filtration process continued as long as the level of the reservoir of feed fluid does not fall below the lowest fluid motive means (e.g., impeller). That way the fluid filtration gap will remain "submersed" (i.e., filled with fluid) independent of the level of feed fluid in the reservoir of feed fluid. (Of course, generally speaking, the fluid level of the reservoir of feed fluid should not be allowed to fall so much that less dense material 74 enters the fluid filtration gap.) The fluid motive means (e.g., impeller) "lifts" the feed fluid, regardless of the level of feed fluid in the reservoir of feed fluid, so that the feed fluid continues to cover the entire filter surface even if the level of feed fluid in the reservoir falls below the level of the filter.

Thus, one significant advantage of this invention is that the feed fluid level can change during filtration without adversely affecting filtration performance. Keeping the fluid filtration gap filled with fluid independent of the level of feed fluid in the reservoir is important for a number of reasons. First, it allows filtration to continue until only small volumes of fluid remain, in other words, to maximize the utilized filter area relative to the sample volume and to subject as much of the feed fluid to the filtration process as possible. Second, keeping the fluid filtration gap filled with feed fluid prevents the filter from drying out, which may adversely affect the integrity of the filter. Third, the system is easier to control and less sensitive to processing variations, because the fluid filtration gap will remain filled with liquid and the filtration process will continue even if the level of feed fluid in the reservoir varies greatly. Vessel 12 (if a vessel is used to contain the reservoir of feed fluid) may be made as small as is necessary to keep the fluid filtration gap filled, in accordance with these and the other factors discussed herein. In many known devices, the area of the filter exposed to feed fluid (i.e., the active filtration area) decreases as the level of feed fluid decreases.

The transmembrane pressure may be controlled independent of the speed of rotation (the speed of rotation helps determine the shear rate and, therefore, the cleaning of the filter). If the fluid filtration gap is under substantial pressure (e.g., because it is submerged to a substantial depth), the transmembrane pressure may be controlled by controlling the back-pressure on the permeate removal line (e.g., with or without a permeate removal pump). If the fluid filtration gap is not subjected to high hydrostatic pressure and the permeate removal system cannot provide a sufficient vacuum on the downstream side of the filter, the transmembrane pressure may not be high enough but that pressure differential may be increased in several ways, e.g., by pressurizing the entire vessel 12 when using "open" embodiments such as in FIGS. 1 and 2 or by using an embodiment such as in FIG. 3, in which the pressure of the fluid filtration gap is isolated or separated from the pressure in the rest of the reservoir of feed fluid. Such pressurization may be desirable to prevent foaming or degassing of the fluid being processed.

In embodiments such as in FIGS. 1 and 2, net feed fluid is drawn into the fluid filtration gap by the removal of permeate through the filter from the feed fluid in the fluid filtration gap. Thus, those flows may be conveniently controlled independent of the rotation of the rotatable member(s).

Many devices of this invention do not require feed pumping means (see, e.g., FIGS. 1 and 2) because permeate withdrawal pumps may be sufficient. If the system in question is vacuum sealed, as permeate is withdrawn by a permeate withdrawal pump, the system will automatically draw feed liquid into the reservoir of feed fluid without the need for a feed pump. That may be further advantageous where the feed liquid contains solids because dispensing with the feed pump eliminates a pump that is likely to have more problems (due to the presence of solids) than the permeate pump (because permeate will generally not contain solids).

Because the outer member, inner member, means (e.g., motor) to rotate the rotatable member(s), permeate withdrawal pump (if used), etc. may be connected to a single member (e.g., a plate), the entire assembly may be placed on any vessel and that member (e.g., the top) need not be specially designed for that vessel. Similarly, a "generic" or "universal" frame may be used to hold the outer member, inner member, means to rotate the rotatable member(s), etc.

The use of a vessel to hold the reservoir of feed fluid allows flotation and/or settling of material in the feed stream. The design of the outer member (e.g., its length, relative size compare to the vessel) helps isolate the fluid movement occurring in the fluid filtration gap from the fluid in the vessel to facilitate flotation and/or settling. Sealing the outer member at the top helps keep the movement of fluid in the fluid filtration gap and in the flow reversal space isolated from the lighter density material collecting in the top of the system outside the outer member, thereby encourage coalescing of the layer of less dense material (layer 74 in the drawings). Even without any flotation or settling, isolating as much of the fluid movement occurring in the fluid filtration gap as possible from the fluid outside the outer member is beneficial. For example, it allows smaller rotation means to be used because the rotation means needs to rotate only the fluid inside the outer member and not also the fluid surrounding the outer member.

Yet another benefit of the present invention is the ease with which the one or more filters can be removed from and replaced in the devices of this invention. For example, if the one or more filters are present on the inside surface of the outer member, the filter(s) may be removed as a unit from the outer member with the outer member in place in the filtration device or after the outer member has been removed from the rest of the device. Various quick change means may be used to keep the one or more filters in place.

Variations and modifications will be apparent to those skilled in the art and the following claims are intended to cover all variations and modifications falling within the true spirit and scope of the invention.

We claim:

1. A rotary filtration device for filtering feed fluid to remove permeate from the feed fluid, the device comprising:
    a) an elongate outer member;
    b) an elongate inner member, which inner member is at least partially disposed within the outer member such that the outer member and the inner member form an elongate fluid filtration gap therebetween into which the feed fluid to be filtered is placed, the inner member having an internal pathway for the flow of feed fluid, the overall direction of which pathway is substantially parallel to the overall direction of the fluid filtration gap;
    c) rotation means for rotating the inner member and outer member with respect to each other;
    d) one or more filters facing the fluid filtration gap through which permeate passes from the feed fluid in the fluid filtration gap during filtration;
    e) fluid connection means for fluidly connecting the fluid filtration gap to the internal pathway of the inner member; and
    f) fluid motive means for moving feed fluid through the fluid connection means during filtration from the fluid filtration gap into the internal pathway or from the internal pathway into the fluid filtration gap.

2. The rotary filtration device of claim 1 wherein the outer member has an inner surface and one of the one or more filters is mounted on the inner surface.

3. The rotary filtration device of claim 1 wherein the outer member and the inner member are cylindrical.

4. The rotary filtration device of claim 1 wherein the outer member is stationary, the inner member has a longitudinal axis of rotation, and the rotation means rotates the inner member about the longitudinal axis of rotation.

5. The rotary filtration device of claim 4 wherein the fluid motive means moves the feed fluid in the internal pathway of the inner member in a direction substantially parallel to the longitudinal axis of rotation.

6. The rotary filtration device of claim 4 wherein the fluid motive means moves the feed fluid in the fluid filtration gap in a direction substantially parallel to the longitudinal axis of rotation.

7. The rotary filtration device of claim 1 further comprising flow direction reversal means to reverse the direction of flow of feed fluid flowing during filtration from the fluid filtration gap into the internal pathway of the inner member or from the internal pathway of the inner member into the fluid filtration gap, so that the overall principal direction of flow of feed fluid in the fluid filtration gap is substantially the opposite of the overall principal direction of flow of feed fluid in the internal pathway of the inner member.

8. The rotary filtration device of claim 7 wherein the flow direction reversal means comprises a member to which the outer member is attached.

9. The rotary filtration device of claim 8 further comprising a top member that is located above the inner member and the outer member, wherein the member to which the outer member is attached comprises the top member.

10. The rotary filtration device of claim 1 wherein the fluid motive means comprises a rotatable impeller that is located within the inner member, the rotation of which impeller will cause the feed fluid within the inner member to move.

11. The rotary filtration device of claim 10 wherein the rotation means also rotates the impeller.

12. The rotary filtration device of claim 1 wherein the rotation means can rotate the inner member and outer member with respect to each other at a high enough velocity to establish Taylor vortices in the feed fluid in the fluid filtration gap.

13. The rotary filtration device of claim 1 further comprising means to remove permeate continuously from the device during filtration.

14. The rotary filtration device of claim 1 further comprising a vessel to hold feed fluid.

15. The rotary filtration device of claim 14 further comprising means to move feed fluid either from the vessel into the internal pathway in the inner member or from the vessel into the fluid filtration gap.

16. The rotary filtration device of claim 14 wherein the outer member is located at least partially within the vessel.

17. The rotary filtration device of claim 14 wherein the vessel has an upper region and the device further comprises a top member that is located proximate the upper region of the vessel.

18. The rotary filtration device of claim 17 wherein the outer member has a lower end and the outer member is suspended from the top member so that the outer member hangs down into the vessel.

19. The rotary filtration device of claim 18 wherein the lower end of the outer member has an opening and the outer member hangs down far enough into the vessel so that the opening is at least sometimes below the level of feed fluid in the vessel during filtration to allow feed fluid to pass through the opening during filtration.

20. The rotary filtration device of claim 17 wherein the inner member is rotatably suspended from the top member so that the rotation means can rotate the inner member.

21. The rotary filtration device of claim 20 wherein the inner member has a lower end and the inner member hangs down far enough into the vessel so that the lower end is at least sometimes below the level of feed fluid in the vessel during filtration.

22. The rotary filtration device of claim 17 wherein the top member fluidly seals the upper region of the vessel so that the vessel can be pressurized.

23. The rotary filtration device of claim 14 wherein the vessel has means to allow within it separation and flotation of material in the feed fluid that is less dense than the average density of the feed fluid.

24. The rotary filtration device of claim 14 wherein the vessel has means to allow within it separation and settling of material in the feed fluid that is denser than the average density of the feed fluid.

25. The rotary filtration device of claim 1 further comprising means to at least temporarily maintain the outer member in a reservoir of feed fluid.

26. The rotary filtration device of claim 25 wherein the outer member has one or more openings through which feed fluid can pass between the fluid filtration gap and the reservoir of feed fluid during filtration.

27. The rotary filtration device of claim 1 wherein the outer member has an inner surface, the inner member has an outer surface, one of the one or more filters is mounted on the inner surface, and one of the one or more filters is mounted on the outer surface.

28. The rotary filtration device of claim 1 further comprising means for pressurizing the fluid filtration gap.

29. The rotary filtration device of claim 28 further comprising means for maintaining a difference between the pressure in the fluid filtration gap and the pressure in any reservoir of feed fluid into which the outer member is placed.

30. A rotary filtration device for filtering feed fluid to remove permeate from the feed fluid, there being a reservoir of feed fluid having a fluid level, the device comprising:

a) an outer member;
b) an inner member, which inner member is at least partially disposed within the outer member such that the outer member and the inner member form a fluid filtration gap therebetween into which the feed fluid to be filtered is placed, the inner member having an internal pathway for the flow of feed fluid;
c) rotation means for rotating the inner member and outer member with respect to each other;
d) one or more filters facing the fluid filtration gap through which permeate passes from the feed fluid in the fluid filtration gap during filtration;
e) fluid connection means for fluidly connecting the fluid filtration gap to the internal pathway of the inner member;
f) fluid motive means for moving feed fluid through the fluid connection means during filtration from the fluid filtration gap into the internal pathway or from the internal pathway into the fluid filtration gap; and
g) flow direction reversal means to reverse the direction of flow of feed fluid flowing during filtration from the fluid filtration gap into the internal pathway or from the internal pathway into the fluid filtration gap, so that the overall principal direction of flow of feed fluid in the fluid filtration gap is substantially the opposite of the overall principal direction of flow of feed fluid in the internal pathway.

31. The rotary filtration device of claim 30 wherein the outer member has an inner surface and one of the one or more filters is mounted on the inner surface.

32. The rotary filtration device of claim 30 wherein the outer member and the inner member are cylindrical.

33. The rotary filtration device of claim 30 wherein the device has a longitudinal axis of rotation.

34. The rotary filtration device of claim 33 wherein the fluid motive means moves the feed fluid in the internal pathway and in the fluid filtration gap in directions that are substantially parallel to the longitudinal axis of rotation and are substantially opposite to each other.

35. The rotary filtration device of claim 30 wherein the flow direction reversal means comprises a member to which the outer member is attached.

36. The rotary filtration device of claim 30 wherein the fluid motive means comprises a rotatable impeller that is located within the inner member, the rotation of which impeller will cause the feed fluid within the inner member to move.

37. The rotary filtration device of claim 36 wherein the rotation means also rotates the impeller.

38. The rotary filtration device of claim 30 wherein the rotation means can rotate the inner member and outer member with respect to each other at a high enough velocity to establish Taylor vortices in the feed fluid in the fluid filtration gap.

39. The rotary filtration device of claim 30 further comprising means to remove permeate continuously from the device during filtration.

40. The rotary filtration device of claim 30 wherein the internal pathway of inner member has a lower end and the outer member has a lower end, the device further comprising means to at least temporarily maintain the outer member or inner member or both at least partially in the reservoir of feed fluid so that the lower end of the outer member or the lower end of the internal pathway of the inner member or both are below the fluid level of the feed fluid in the reservoir at least some of the time during filtration so that feed fluid can flow from the reservoir of feed fluid into the fluid filtration gap or into the internal pathway of the inner member during filtration.

41. The rotary filtration device of claim 30 wherein the outer member cannot rotate and the inner member is rotatably suspended so that the rotation means can rotate the inner member.

42. The rotary filtration device of claim 30 further comprising means to allow separation and flotation of material in the feed fluid that is less dense than the average density of the feed fluid.

43. The rotary filtration device of claim 30 further comprising means to allow separation and settling of material in the feed fluid that is denser than the average density of the feed fluid.

44. The rotary filtration device of claim 30 wherein the outer member has an inner surface, the inner member has an outer surface, one of the one or more filters is mounted on the inner surface, and one of the one or more filters is mounted on the outer surface.

45. The rotary filtration device of claim 30 further comprising means for pressurizing the fluid filtration gap above the pressure in the reservoir of feed fluid.

46. The rotary filtration device of claim 30 wherein the inner member rotates and the motive means comprises a rotatable impeller that is located within the internal pathway and that is rotated by the rotation means along with the inner member.

47. A rotary filtration device for filtering feed fluid to remove permeate from the feed fluid, there being a reservoir of feed fluid having a fluid level, the device comprising:

a) an outer member having a lower end with an opening;

b) a rotatable inner member (i) having a longitudinal axis of rotation, (ii) having an internal pathway for the flow of feed fluid, which pathway has a lower end, and (iii) located at least partially within the outer member such that the outer member and the inner member form a fluid filtration gap therebetween into which the feed fluid to be filtered is placed;

c) rotation means for rotating the inner member about its longitudinal axis of rotation;

d) one or more filters facing the fluid filtration gap through which permeate passes from the feed fluid in the fluid filtration gap during filtration;

e) fluid connection means for fluidly connecting the fluid filtration gap to the internal pathway of the inner member;

f) fluid motive means for moving feed fluid through the fluid connection means during filtration from the fluid filtration gap into the internal pathway or from the internal pathway into the fluid filtration gap;

g) flow direction reversal means to reverse the direction of flow of feed fluid flowing during filtration from the fluid filtration gap into the internal pathway of the inner member or from the internal pathway of the inner member into the fluid filtration gap, so that the overall principal direction of flow of feed fluid in the fluid filtration gap is substantially the opposite of the overall principal direction of flow of feed fluid in the internal pathway of the inner member, both overall principal directions of flow being substantially parallel to the longitudinal axis of rotation; and h) means to at least temporarily maintain the outer member or inner member or both at least partially in the reservoir of feed fluid so that the lower end of the outer member or the lower end of the internal pathway of the inner member or both lower ends are below the fluid level of the feed fluid in the reservoir at least some of the time during filtration so that feed fluid can flow from the reservoir into the fluid filtration gap or into the internal pathway of the inner member during filtration.

48. The rotary filtration device of claim 47 wherein the flow direction reversal means comprises a flow direction reversal member to which the outer member is connected.

49. The rotary filtration device of claim 47 wherein the reservoir of feed fluid is held in a vessel having an upper region and the rotary filtration device rests at least partially in the vessel.

50. The rotary filtration device of claim 49 wherein the flow direction reversal member is connected to the upper region of the vessel.

51. The rotary filtration device of claim 49 wherein the vessel has means to allow within it separation and flotation of material in the feed fluid that is less dense than the average density of the feed fluid.

52. The rotary filtration device of claim 49 wherein the vessel has means to allow within it separation and settling of material in the feed fluid that is denser than the average density of the feed fluid.

53. The rotary filtration device of claim 47 wherein the fluid motive means comprises a rotatable impeller that is located within the inner member, the rotation of which impeller will cause the feed fluid within the inner member to move.

54. The rotary filtration device of claim 53 wherein the rotation means also rotates the impeller.

55. The rotary filtration device of claim 47 wherein the rotation means can rotate the inner member at a high enough velocity to establish Taylor vortices in the feed fluid in the fluid filtration gap.

56. The rotary filtration device of claim 47 further comprising means to remove permeate continuously from the device during filtration.

57. The rotary filtration device of claim 47 wherein the outer member has one or more openings through which feed fluid can pass between the fluid filtration gap and the reservoir of feed fluid during filtration.

58. The rotary filtration device of claim 47 wherein the outer member has an inner surface and one of the one or more filters is mounted on that inner surface.

59. The rotary filtration device of claim 47 further comprising means for pressurizing the fluid filtration gap above the pressure in the reservoir of feed fluid.

60. A rotary filtration device for filtering feed fluid to remove permeate from the feed fluid, the device comprising:

a) a vessel having an upper region and into which feed fluid is placed, the feed fluid having a fluid level when it is in the vessel;

b) a stationary cylindrical outer member (i) located within the vessel and suspended from the upper region of the vessel, (ii) having a lower end with an opening, and (iii) having an inner surface with a filter mounted thereon through which permeate passes during filtration;

c) a rotatable cylindrical inner member (i) rotatably suspended from the upper region of the vessel, (ii) having a longitudinal axis of rotation, (iii) having an internal pathway for the flow of feed fluid, which pathway is substantially cylindrical in shape and has a lower end, and (iv) located within the outer member such that the outer member and the filter on the inner member form an annular fluid filtration gap therebetween into which the feed fluid to be filtered is placed; the lower end of the outer member or the lower end of the internal pathway of the inner member or both being below the fluid level in the vessel at least some of the time so that feed fluid can flow from the vessel into the fluid filtration gap or into the internal pathway of the inner member during filtration;

d) rotation means for rotating the inner member about its longitudinal axis of rotation;

e) fluid connection means for fluidly connecting the fluid filtration gap to the internal pathway of the inner member proximate the upper region of the vessel;

f) fluid motive means for moving feed fluid through the fluid connection means during filtration from the fluid filtration gap into the internal pathway or from the internal pathway into the fluid filtration gap; and g) flow direction reversal means to reverse the direction of flow of feed fluid flowing during filtration from the fluid filtration gap into the internal pathway of the inner member or from the internal pathway of the inner member into the fluid filtration gap, so that the overall principal direction of flow of feed fluid in the fluid filtration gap is substantially the opposite of the overall principal direction of flow of feed fluid in the internal pathway of the inner member, both overall principal directions of flow being substantially parallel to the longitudinal axis of rotation.

61. The rotary filtration device of claim 60 further comprising a top member that is located (i) proximate the upper region of the vessel and (ii) above the inner member and the outer member.

62. The rotary filtration device of claim 61 wherein the outer member is connected to the upper region of the vessel by being connected through the top member.

63. The rotary filtration device of claim 61 wherein the flow direction reversal means comprises the top member.

64. The rotary filtration device of claim 61 wherein the top member fluidly seals the upper region of the vessel so that the vessel can be pressurized.

65. The rotary filtration device of claim 60 wherein the fluid motive means comprises a rotatable impeller that is located within the inner member, the rotation of which impeller will cause the feed fluid within the inner member to move.

66. The rotary filtration device of claim 65 wherein the rotation means also rotates the impeller.

67. The rotary filtration device of claim 60 wherein the rotation means can rotate the inner member at a high enough velocity to establish Taylor vortices in the feed fluid in the fluid filtration gap.

68. The rotary filtration device of claim 60 further comprising means to remove permeate continuously from the device during filtration.

69. The rotary filtration device of claim 60 wherein the vessel has means to allow within it separation and flotation of material in the feed fluid that is less dense than the average density of the feed fluid.

70. The rotary filtration device of claim 60 wherein the vessel has means to allow within it separation and settling of material in the feed fluid that is denser than the average density of the feed fluid.

71. The rotary filtration device of claim 60 wherein the outer member has one or more openings through which feed fluid can pass between the fluid filtration gap and the feed fluid in the vessel during filtration.

72. The rotary filtration device of claim 60 wherein the inner member has an outer surface and a filter is mounted on that outer surface so that permeate can be removed from the feed fluid in the fluid filtration gap and pass through that filter as well as the filter on the inner surface of the outer member.

73. The rotary filtration device of claim 60 further comprising means for pressurizing the fluid filtration gap above the pressure in the vessel.

74. A rotary filtration device for filtering feed fluid to remove permeate from the feed fluid, there being a reservoir of feed fluid having a fluid level, the device comprising:

a) an outer member having a lower end with an opening and an upper end with an opening;

b) a rotatable inner member (i) having a longitudinal axis of rotation, (ii) having an internal pathway for the flow of feed fluid, which pathway has a lower end and an upper end, and (iii) located at least partially within the outer member such that the outer member and the inner member form a fluid filtration gap therebetween into which the feed fluid to be filtered is placed;

c) rotation means for rotating the inner member about its longitudinal axis of rotation;

d) one or more filters facing the fluid filtration gap through which permeate passes from the feed fluid in the fluid filtration gap during filtration;

e) fluid connection means for fluidly connecting the fluid filtration gap to the internal pathway of the inner member;

f) fluid motive means for moving feed fluid through the fluid connection means during filtration from the fluid filtration gap into the internal pathway or from the internal pathway into the fluid filtration gap;

g) flow direction reversal means to reverse the direction of flow of feed fluid flowing during filtration from the fluid filtration gap into the internal pathway of the inner member or from the internal pathway of the inner member into the fluid filtration gap, so that the overall principal direction of flow of feed fluid in the fluid filtration gap is substantially the opposite of the overall principal direction of flow of feed fluid in the internal pathway of the inner member, both overall principal directions of flow being substantially parallel to the longitudinal axis of rotation, the upper end of the outer member being substantially fluidly sealed to the flow direction reversal means and the upper end of the inner member being spaced from the flow direction reversal means to provide a space in which the feed fluid can reverse its direction of flow; and h) means to at least temporarily maintain the outer member or inner member or both at least partially in the reservoir of feed fluid so that the lower end of the outer member or the lower end of the internal pathway of the inner member or both lower ends are below the fluid level of the feed fluid in the reservoir at least some of the time during filtration so that feed fluid can flow from the reservoir into the fluid filtration gap or into the internal pathway of the inner member during filtration.

75. The rotary filtration device of claim 74 further comprising means for pressurizing the fluid filtration gap above the pressure in the reservoir of feed fluid.

76. A process of filtering feed fluid to remove permeate from the feed fluid, the process comprising:

a) providing the rotary filtration device of claim 1;

b) placing feed fluid in the fluid filtration gap of the device;

c) causing the rotation means to rotate; and d) removing permeate from the feed fluid in the fluid filtration gap through the one or more filters of the rotary filtration device.

77. The process of claim 76 wherein the feed fluid to be filtered is selected from the group consisting of: fluids comprising a liquid phase and a gaseous phase; fluids comprising at least two aqueous phases; fluids comprising aqueous and non-aqueous phases; fluids containing at least one solid phase; fluids containing surfactants, emulsions, and/or liposomes; fluids containing a food, oil, and/or a petroleum product; fluids containing a drug or drug precursor; and biological fluids.

78. The process of claim 76 wherein the feed fluid to be filtered is a biological fluid selected from the group consisting of: biological fluids containing genetically engineered material; biological fluids resulting from a fermentation process; biological fluids containing microorganisms; biological fluids containing blood, blood serum, plasma, and/or blood cells; biological fluids containing a plant extract; and biological fluids comprising a vegetable or fruit juice.

79. The process of claim 76 wherein the feed fluid to be filtered contains materials that are denser than the average density of the feed fluid and the process further comprises allowing at least some of the denser materials to settle and withdrawing them from the rotary filtration device.

80. The process of claim 76 wherein the feed fluid to be filtered contains materials that are less dense than the average density of the feed fluid and the process further comprises allowing at least some of the less dense materials to float and withdrawing them from the rotary filtration device.

* * * * *